April 1, 1941. H. J. FURBER 2,236,793
CONSERVATOR MECHANISM
Original Filed Oct. 9, 1935 6 Sheets-Sheet 1

INVENTOR.
Henry Jewett Furber

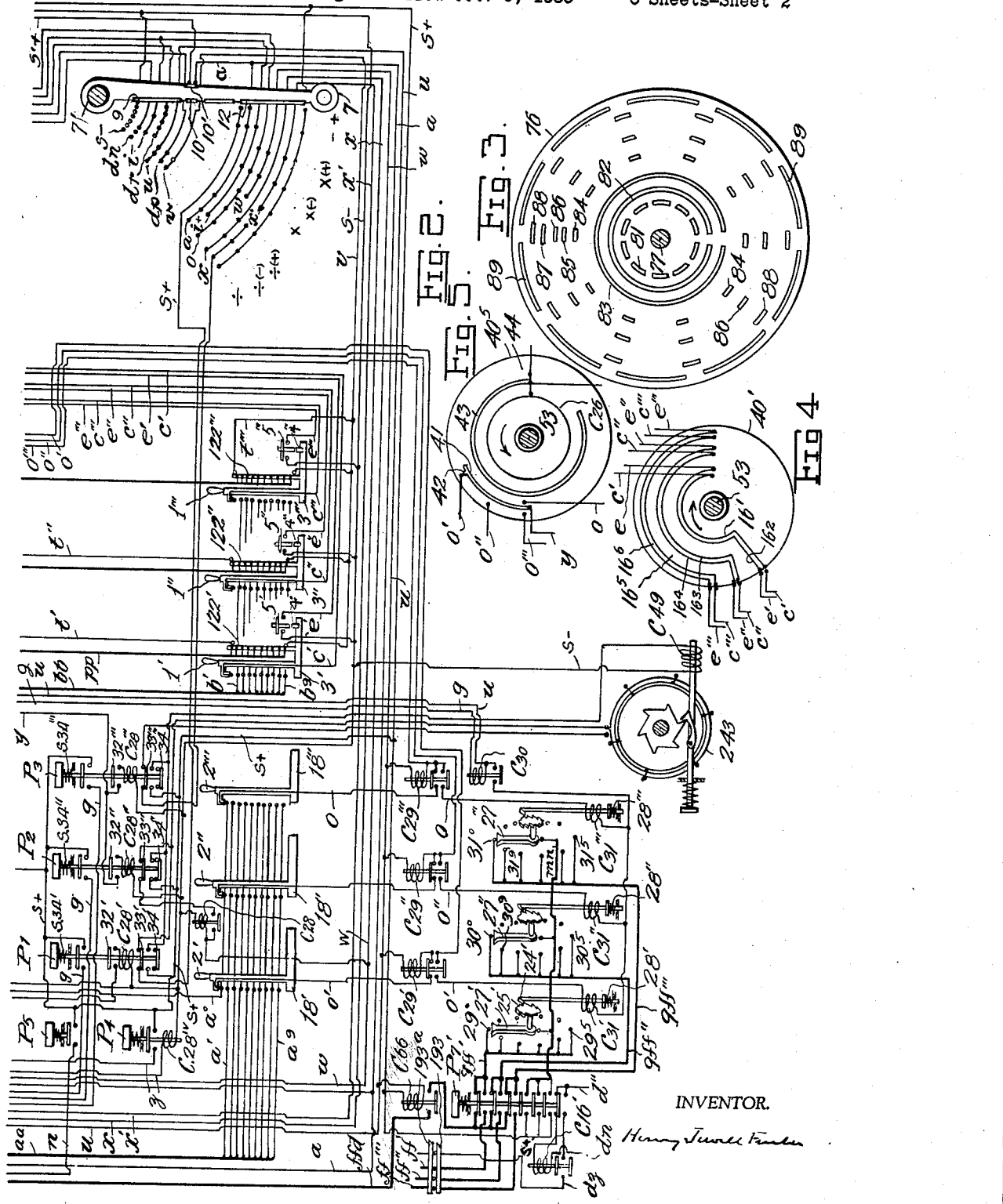

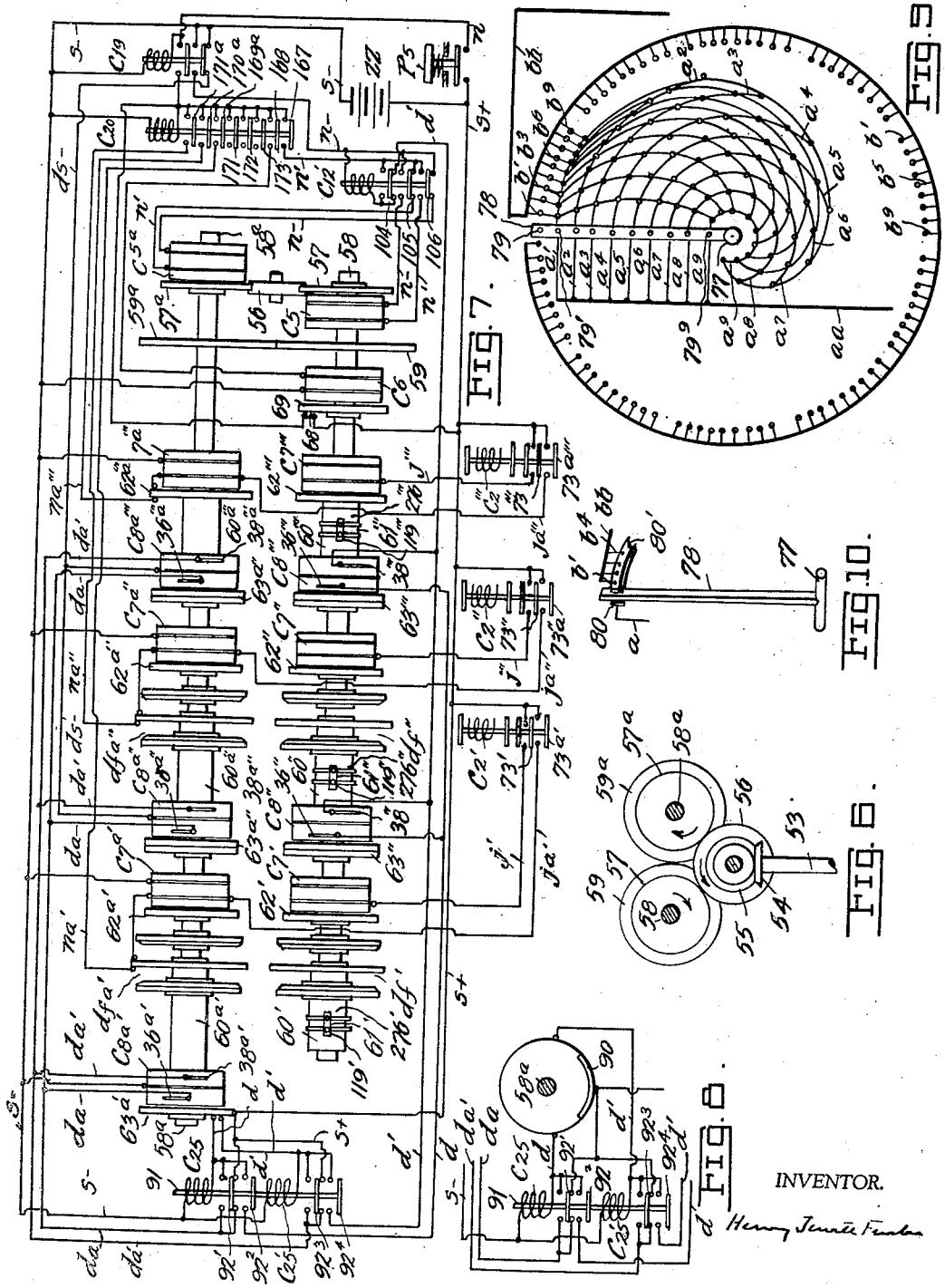

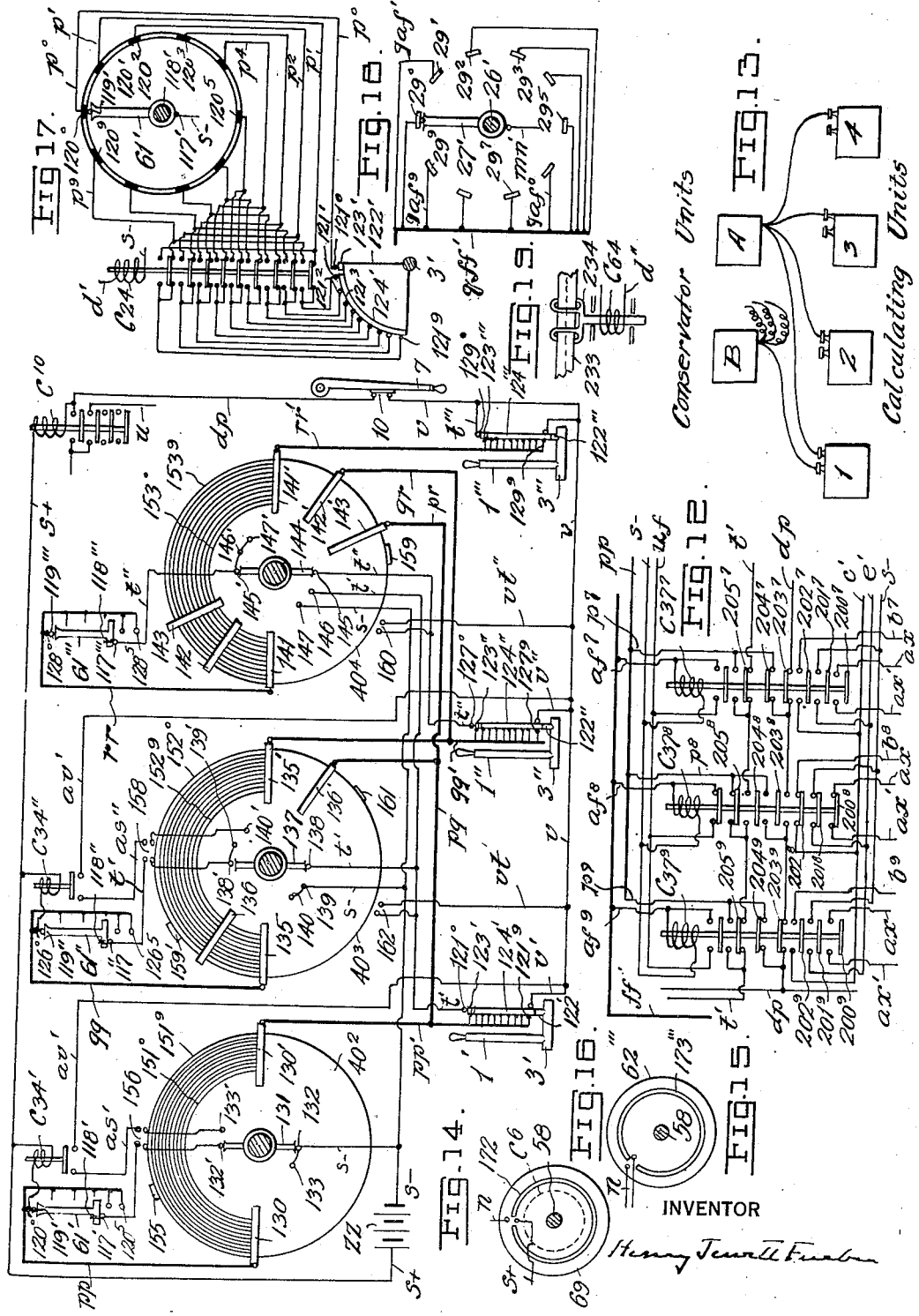

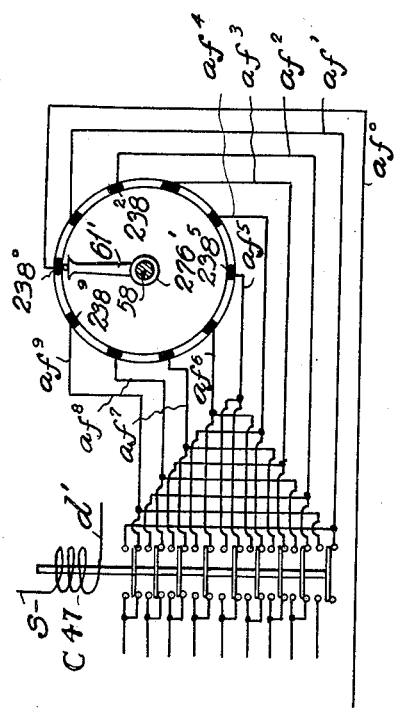

Patented Apr. 1, 1941

2,236,793

UNITED STATES PATENT OFFICE 2,236,793

CONSERVATOR MECHANISM

Henry Jewett Furber, Silver Spring, Md.

Original application October 9, 1935, Serial No. 44,159. Divided and this application July 15, 1937, Serial No. 153,844

6 Claims. (Cl. 235—61)

This invention relates to means for storing quantities developed at a calculating unit or a plurality thereof, in conservators remote and normally disconnected from the calculating units; and the present application is a division of my copending application Serial No. 44,159, filed October 9, 1935, as an extension, in part, of application Serial No. 723,595 filed May 2, 1934.

An object of this invention is to provide means whereby a quantity, whether positive or negative, may be transferred from a calculating unit to a conservator or vice versa.

Another object of this invention is to provide means, as for example, manual controls, for setting up quantities for operation at the calculating unit, and means to operate the calculating unit under optional control either of the quantities so set up at the controls, or, under control of one or more stored quantities, or under joint control of such set up quantity and a quantity so stored.

Another object of this invention is to provide means for simultaneously operating a plurality of calculating units in similar or dissimilar computations, under control of the same conservator unit or conservator units.

Another object of this invention is to provide means for comparing the numerical value of an accumulated quantity and a quantity stored at a conservator, and means to operate the calculating unit under control of the conservator.

With the foregoing and other objects in view, as may appear, the invention now will be described in connection with the accompanying figures in which, with view to clearness, details superfluous to the matter of this divisional application, are, in so far as possible, suppressed.

Figure 2 is a diagrammatic view of the manual controls at which quantities may be established, and a state control.

Figure 3 is a diagrammatic view from the right of the disk 76 shown in Figure 1 with various electrical conductors which pass from face to face.

Figure 4 is a diagrammatic view of the disk 40' at the transmitter 40 shown in Figure 1.

Figure 5 is a diagrammatic view of the lower face of the disk 40⁵ at the transmitter 40.

Figure 1:
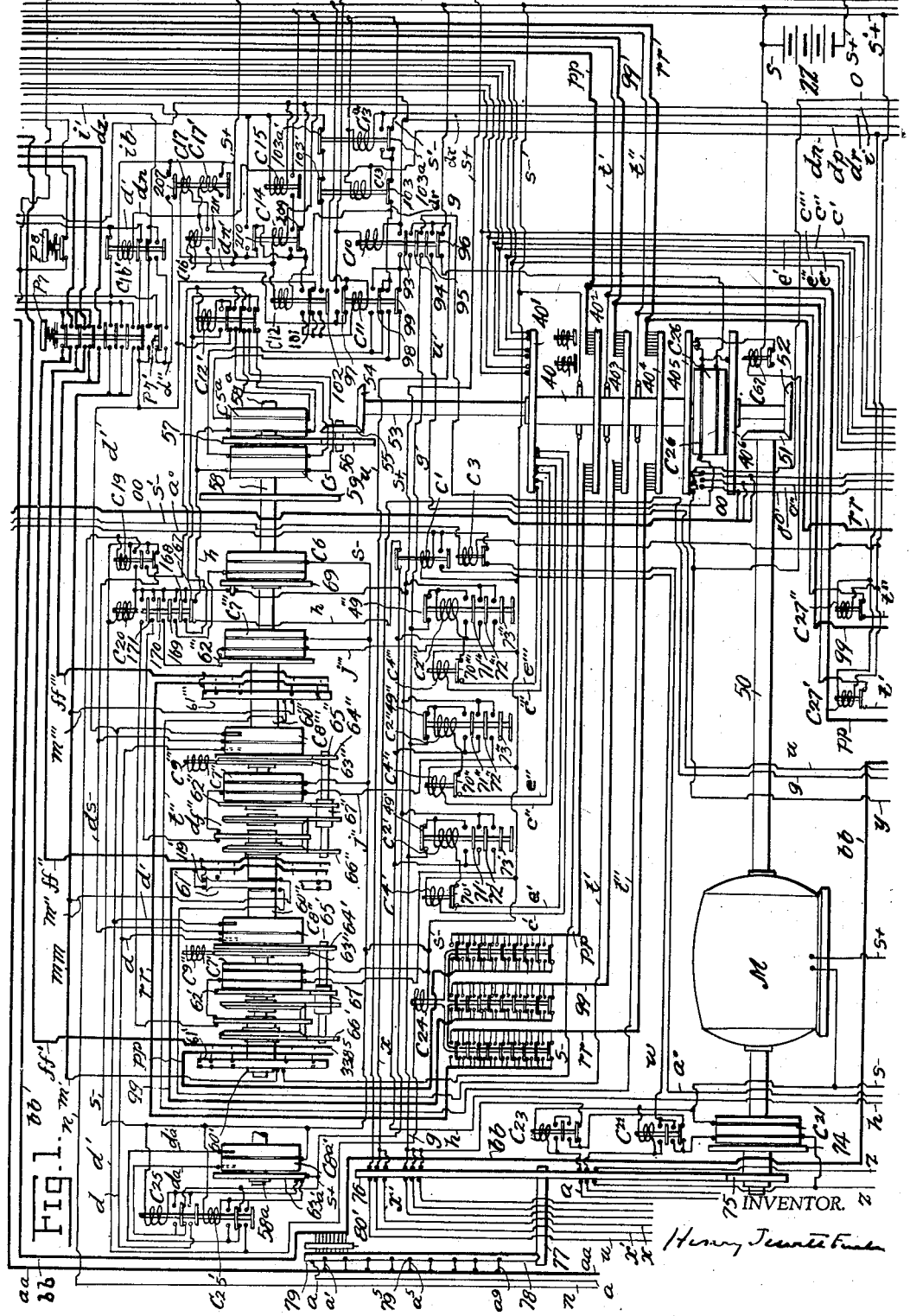
Figure 1 is a general diagrammatic view of a calculating unit from which quantities may be transferred to a conservator and which may be operated either under control of a conservator or conservators, or by manual controls.

Figure 6 is a diagrammatic view from the right of the members shown in Figure 1 which transmit motion from the shaft 53 to the shafts 58 and 58a.

Figure 7 is a diagrammatic plan view of the shafts 58, 58a with members and electrical connections appurtenant thereto.

Figure 8 is a detail view from the left of the armature 63a' shown in Figure 7, with electrical connections.

Figure 9 is a diagrammatic view from the right of a timing arm 78 shown in Figure 1, with terminals at which circuits may be closed.

Figure 10 is a perspective view from the right, showing the pathway of the arm 78, between typical complementary terminals.

Figure 11:
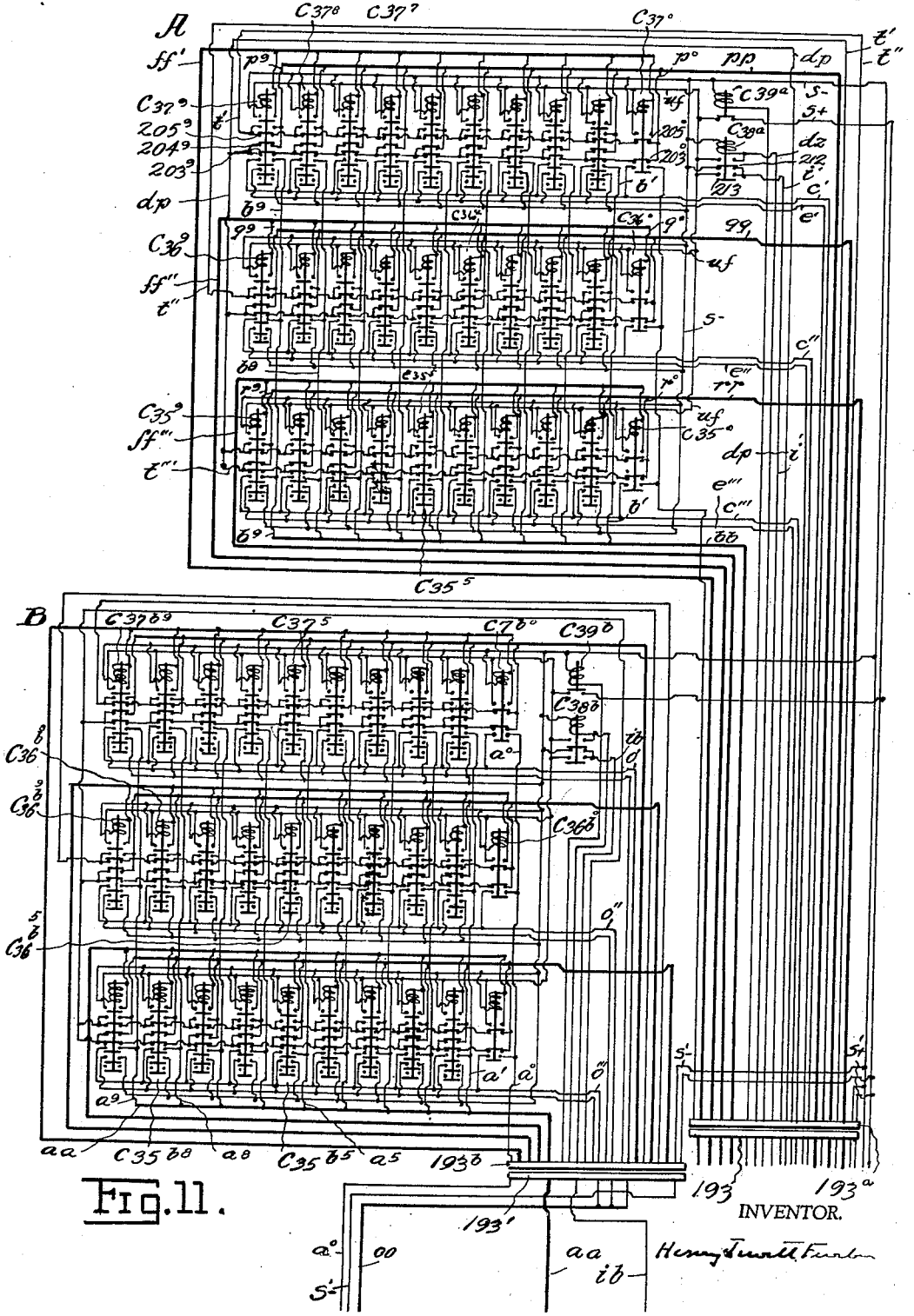

Figure 11 is a diagrammatic view of typical conservators A and B, at which quantities may be stored.

Figure 12 is a diagrammatic view of three typical relays shown in Figure 11, with the middle relay energized and the remaining relays de-energized.

Figure 13 is a diagrammatic view illustrating a plurality of conservators as variously connected with a plurality of calculating units.

Figure 14 is a diagrammatic view of the disks 40², 40³, 40⁴, shown in Figure 1, with electrical connections.

Figure 15 is a side view from the left of the armature 62''' shown in Figure 1, operative in restoring an accumulator arm to zero position.

Figure 16 is a diagrammatic view from the left of the armature 69 shown in Figures 1 and 7, operative in clearing the calculating unit.

Figure 17 is a diagrammatic view from the right of a typical accumulator arm shown in Figure 1, with contacts at which it may close circuits, to comparator mechanism at a lever l', l'', l''', shown in Figure 2.

Figure 18 is a diagrammatic view from the right of a typical quotient arm shown in Figure 2 with contacts at which it may close circuits.

Figure 19 is a detail view of an inking ribbon for recording positive and negative resultants in different colors, with solenoid to shift position.

Figure 20 is a typical accumulator arm 61' shown in Figure 1, with contacts at which it may close circuits to recording apparatus or to the conservators.

All wheels disclosed in the above figures are toothed throughout, there being no mutilated gearings. The wires leading from the positive and negative poles of the source ZZ are designated respectively as wires $s^+$ and $s^-$. Cables carrying a plurality of wires are indicated by heavy lines. Bridges or switches at which the circuits carried by cables are shown as closed or broken, are multiple conductors which close separately the circuits of the several wires, being similar in principle to the switch S, shown in Figure 15 of Furber, 2,083,947. The direction of motion or transmission at rotary members, is indicated by arrows.

The term "accumulator" is employed to designate collectively the members 61', 61'', 61''' (Figure 1), said members individually being termed "accumulator arms," as shown in Figures 1, 9, 14, the accumulator arms 61', 61''' being concealed by contact benches in Figure 1. The term circuit controller may be applied to the transfer system mounted on shaft 58a (Figure 7).

General description

A quantity may be transmitted to the calculating unit (Figure 1) by means of electric circuits controlled by manual levers 1', 1'', 1''', 2', 2'', 2''' (Figure 2), or by equivalent devices, such as conservators A, B (Figure 11). A master switch 7 (Figure 2) is a state control which determines the nature of the operation which shall be performed. The depression of the push button P.1, in addition and subtraction, P.2, in multiplication and P.3, in division (Figure 2), causes motion to be transmitted from an electric motor, M. (Figure 1), preferably in constant operation and revolving always in the same direction, to the accumulator arms 61', 61'', 61''' which are elements, respectively in progressive denominational orders of the apparatus and correspond to hundreds, tens and units. Motion is likewise communicated to a progressively movable switch or timing arm 78 (Figures 1, 9) which measures the movement of the accumulator arms 61', 61'', 61''', and arrests such members at angles of displacement corresponding to quantities selected at the manual controls.

The relays C.11, C.12 (Figure 1) control the direction of motion communicated to the accumulator arms 61', 61'', 61''' from the motor M. consistently, for example, with the positive or negative quality of the quantity transmitted.

The wheel 76 (Figures 1, 3) closes and breaks, through conductors which it carries, circuits established at the master switch 7 (Figure 2) or closed at a push button P.1, P.2, P.3, in such selective order, as to bring the members thereby affected, into operation in their proper turn. Said push buttons are introduced, in order that the calculating unit be brought into operation, only after all other controls are properly adjusted.

Referring to Figure 1, the motor M. connected with the source ZZ through the wires s+, s−, and preferably in constant operation, imparts motion through the shaft 50, wheels 51, 52, shaft 53, wheels 54, 55, 56 (Figure 6), armature 57 and the electric clutch C.5 to the shaft 58, on which are mounted the sleeves 60', 60'', 60''', carrying respectively the differentially operated accumulator arms 61', 61''', 61''.

Motion is selectively transmitted to the sleeves 60', 60'', 60''', on which are fixed the accumulator arms 61', 61'', 61''' (Figure 1) by electric clutches C.7', C.7'', C.7''' which are fixed to the shaft 58, and operate respectively on the armature 62', 62'', 62'''. The sleeves 60', 60'', 60''' are carried by the shaft 58. The armature 62''' is integral with the sleeve 60'''. The armature 62'' transmits motion to the sleeve 60'', through the composite idler 67'' floating on the pivot 65'' and thence through the differential gearing Df'', the middle member of which is integral with the sleeve 60''. The armature 62' imparts motion to the sleeve 60', in similar manner, through the transmission 67' and the differential gearing Df'. The differentials Df', Df'', are introduced, in order that the accumulator arms 61', 61'' may be responsive, each to quantities originating in its own corresponding denominational order, while simultaneously absorbing the carry-over from orders therebelow. Carry-over is transmitted from the units order to the tens, by the clutch C.8''' fixed to the sleeve 60''' (Figure 1) through the gears 64''', 66'' fixed on the shaft 65 to the differential Df'', and similarly from the tens to the hundreds order by the clutch C.8'' and members 64', 65', 66' to the differential Df'.

Positioning pins C.9'', C.9''', well known to the art, are indicated in Figure 1, their purpose being to correct overdraft, and to block a lateral member of a planetary gearing when the other lateral member be alone in operation. Such positioning pins may be employed where needed.

The orbits of the accumulator arms 61', 61'', 61''' are each divided into ten unitary steps of 36° corresponding to the numerals 0–9 (Figure 20).

Fixed on the motor shaft 50 is the electric clutch C.21. which, when energized, transmits motion through the armature 74 floating in solidarity with the pinion 75 on the motor shaft 50, to the wheel 76, fixed on the shaft 77 together with the timing arm 78 (Figures 1, 9). The timing arm 78 synchronizes in movement with the accumulator arms 61', 61'', 61''', moving, for example, through an arc of 3.6°, while an accumulator arm 61', 61'', 61''' moves through an arc of 36°. It is the function of the timing arm 78 to close circuits, as it advances, which selectively arrest the accumulator arms 61', 61'', 61''', at angles of displacement corresponding to the quantities established at the manual controls shown in Figure 2 or at the conservators A., B. (Figure 11), as will hereinafter be described.

Fixed together with the levers 1', 1'', 1''' respectively, (Figure 2) on the axles 3', 3'', 3''', are the cams, 4', 4'', 4''', which in normal position support the bridges 5', 5'', 5'''. Deflection of the levers 1', 1'', 1''' displaces the cams 4', 4'', 4''', releasing, respectively the bridges 5', 5'', 5''', which, falling through gravity, close circuits over the wires e', e'', e''' (Figures 2, 1) to the electric relays C.2', C.2'', C.2'''. These circuits parallel each the others, the relays C.2', C.2'', C.2''' provoking, respectively, movement of the accumulator arms 61', 61'', 61''', by motor M. as presently described.

The circuit closed at the bridge 5''' (Figure 1) for example, when the lever 1''' is deflected, originates at the source ZZ and passes through the wire s−, the bridge 5''', the wire e''' over the conductor 16⁶ at the disk 40' (Figures 1, 4), presently described, and over the bridge 70''' at the relay C.4''' (Figure 1) to the negative pole of the relay C.2'''. Circuit to the positive pole of the relay C.2''' is momentarily completed at the bridge 49''' through the wire g, connected with the source ZZ (Figure 1) through the wire s+ when, for example, the push button P.1, (Figure 2), is depressed. The relay C.2''' (Figure 1) is then held in stick, by circuit extending from its positive pole, over the bridges 71''', 72''', carried by the relay C.2''' and the wire s+, back to the source ZZ. From the bridge 72''', so closed at the relay C.2''', circuit through the wire h extends over the bridge 167 at the relay C.20, shown with parts broken away in Figure 1, and in entirety in Figure 7, to the positive poles of the clutches C.5, C.5a, circuit to the negative poles of which may be selectively controlled by the master switch 7 (Figure 2) or otherwise, as hereinafter described. Circuit is closed in the accumulation of a positive quantity to the negative pole of the clutch C.5 (Figure 1) which transmits motion in clockwise direction to the accumulator arms 61', 61", 61'''. During the accumulation of a negative quantity, circuit is closed to the negative pole of the clutch C.5a; and the movement of the accumulator arms 61', 61", 61''' is reversed. The clutch C.5a (Figures 1, 7) is fixed on the shaft 58a. The armature 57a of the clutch C.5a floats on the shaft 58a. The armature 57 of the clutch C.5, floats on the shaft 58. The wheel 56 meshes with the armatures both 57 and 57a (Figure 6) Fixed respectively to the shafts 58, 58a, are the wheels 59, 59a (Figures 6, 7) in mesh one with the other, to the effect that when the clutch C.5 is energized and the shaft 58 is rotated by the motor in clockwise direction, the shaft 58a is rotated in direction opposite thereto; and when the clutch C.5a is energized, and the shaft 58a is rotated in clockwise direction, the shaft 58 is rotated in direction opposite to clockwise. The shaft 58a carries transmission largely similar to that carried by the shaft 58; and is provided with an additional clutch C.8a' shown in Figure 7 and with broken shaft in Figure 1, which operates as presently described.

When energized, the clutch C.5 (Figures 1, 7), in accumulation of a positive quantity, clutches the armature 57 constantly revolving, and receives motion in clockwise direction, which it imparts to the shaft 58, on which are fixed the electric clutches C.7''', C.7", C.7'. Retraction of the plunger of the relay C.2''' (Figure 1), for example, as herebefore described, closes, at bridge 73''', a circuit through the wire j''' to the clutch C.7'''. This circuit originating at the source ZZ, passes through the wire s+ over the bridge 73''' through the wire j''' to the clutch C.7''' and, thence, through the wire s− back to the source ZZ. The clutch C.7''' so energized, clutches and rotates its armature 62''', which is fixed together with the accumulator arm 61''', on the sleeve 60'''.

In the same manner and through similar circuits, the relays C.2", C.2' controlled respectively by the levers 1", 1', close circuit at the bridges 73", 73', through the wires j", j', on the clutches C.7", C.7' (Figure 1) whose negative poles are connected with the wire s−, and which transmit, respectively, motion to the accumulator arms 61", 61', through the right lateral and middle members of the differential gearings Df", Df'. The left lateral members of these differential gearings float respectively on the sleeves 60", 60', and receive the carry over, as above described, from the next lower denominational orders, permitting thereby, the simultaneous operation of all orders of the calculating unit. The relays C.2", C.2', close, at the bridges 72", 72', circuit through the wire h to the clutch C.5, in common with the realy C.2''', or in the accumulation of a negative quantity involving reversed motion, to the clutch C.5a.

The accumulator arms 61', 61", 61''' when set in motion, are severally and respectively arrested at angles of displacement determined by the levers 1', 1", 1''', and jointly in multiplication by the levers 2', 2", 2''' (Figure 2). Extending past all levers 1', 1", 1''', are the wires $b^1$–$b^9$. The wires $b^1$–$b^9$ are shown as connected with terminals in the orbit of the timing arm 78 and as carried in a cable bb, to the levers 1', 1", 1''' (Figures 1, 2). According to the angle at which such levers 1', 1", 1''', be manually deflected, circuits are closed upon selected b wires (Figure 2) whence current flows through the levers 1', 1", 1''' and the wires c', c", c''' (Figures 2, 1) respectively, to the relays C.4', C.4", C.4''', the connections being similar at all the levers 1', 1", 1'''.

Referring to Figure 9, the timing arm 78 is shown as carrying a conductor 79, which, in addition and subtraction, closes circuit from the wire a to the wires $b^1$–$b^9$, represented as descending towards the axis of said timing arm in the form of spirals and intersecting wires $a^1$–$a^9$, which respectively may be closed, in multiplication, to the wires $b^1$–$b^9$ by the conductors $79^1$–$79^9$, at progressive contacts. The angle of displacement of said timing arm, when closing any certain wires, say wire $a^3$ on a wire, say wire $b^4$, corresponds to the multiple of the index numerals 3 and 4 which identify respectively the two said wires, as presently described.

The moment at which the relays C.4', C.4", C.4''' shall break, respectively at bridges 70', 70", 70''', circuit to the relays C.2', C.2", C.2''', is timed by the timing arm 78 (Figures 1, 9, 10) rotated on the shaft 77.

The timing arm 78 revolving, may close circuits between various pairs of terminals fixed, at the sides of its pathway upon benches. The position and the pathway of arm 78, between typical benches 80, 80' is indicated diagrammatically in Figure 10.

Extensions of the wires $b^1$–$b^9$ (Figure 9) emerge from the cable bb, in recurrent series separated one from another, by neutral spaces which correspond to zero, from any one of which neutral spaces the timing arm 78 may enter on an operation, of addition, subtraction or division.

Assume, as an example, that the positive quantity 598 were to be transmitted to the accumulator arms 61', 61", 61''' (Figure 1). The lever 1' would be manually deflected, closing circuit through the wire e' at the bridge 5' (Figure 2) to the relay C.2' (Figure 1); and the circuit from the wire $b^5$ (Figure 2) through the wire c' (Figures 2, 1) to the relay C.4'. Similarly, by manipulation of the levers 1", 1''' (Figure 2), circuits are closed respectively through the wires e", e''', to the relays C.2", C.2''' (Figure 1), and from the wires $b^9$, $b^8$ (Figure 2) through the wires c", c''' (Figures 2, 1) to the relays C.4", C.4'''.

The master switch 7 (Figure 2) is manually placed in position +, closing at the contact plate 9, current from the wire s− on the wire dr leading over the bridge 98 at the relay C.11 to the negative pole of the clutch C.5, whose positive pole is connected through circuit of the wire h already traced, back to the source ZZ. At the contact plate 12, circuit already traced, is closed by the master switch 7, from the wire s+ to the wire a (Figures 2, 1), leading to the exterior series of terminals at the timing arm 78 (Figure 9). The push button P.1 (Figure 2) is then depressed, imparting an initial impulse over the bridges 49', 49", 49''' (Figure 1) to the relays C.2', C.2", C.2''', through the wire g, closed momentarily by a conductor of series 84 carried by the wheel 76 (Figures 1, 3).

The relays C.2', C.2", C.2''' (Figure 1) energized momentarily through the wire g, retract their plungers and are held in stick completing circuit through the wire h already traced, to the clutch C.5, and closing circuit, likewise, through the wire j', j'', j''', to the clutches C.7', C.7'', C.7''', as above described. The clutch C.5, being energized, motion in clockwise direction is imparted by the motor M. through the transmission already described, to the accumulator arms 61', 61'', 61'''.

An extension of the wire g passes over the lower bridges of the relays C.23, C.22 to the positive pole of the clutch C.21 (Figure 1), from the negative pole whereof circuit is completed through the wire s⁻ back to the source ZZ. So energized, the clutch C.21 clutches the disk 74 and imparts initial motion through the disk 74, pinion 75, wheel 76, and shaft 77 to the timing arm 78 (Figure 9) rotated invariably, in clockwise direction.

When the timing arm 78 has advanced five steps, circuit is completed by the conductor 79 (Figure 9) from the wire a to the wire $b^5$ closed at the lever 1' (Figure 2) and through the wire c' from the lever 1' to the relay C.4' (Figure 1) which, retracting its plunger, breaks at bridge 79' circuit over the wire e' to the relay C.2' arresting thereby, as above described, the accumulator arm 61' at an angular displacement of five steps. The lever 1''' (Figure 2) closing circuit through the wire e''' to the relay C.4''' (Figure 1) from the wire $b^8$ the accumulator arm 61''' is arrested at an angular displacement of eight steps, when the timing arm 78 (Figure 1) reaches the terminal of the wire $b^8$. Circuit is still closed by the relay C.2'' on the clutches C.5, C.7'', and the accumulator arm 61'' maintains its motion. As the timing arm 78 passes to the terminal of the wire $b^9$, circuit is closed by the conductor 79 through the wires a, $b^9$, c'' to the relay C.4''; and the accumulator arm 61'' is arrested at an angular displacement of nine steps. The operation thereby is completed, the accumulator arms 61', 61'', 61''', reflecting the quantity 598. Current through the wire h to the clutch C.5 now being wholly interrupted, the armature 57 (Figure 1) is released by the clutch C.5; and the transmission of motion from the motor M is broken to the shaft 58.

The push button P.1 is retained, during the above operation, by the solenoid C.28' (Figure 2). When circuit is broken through the wire h, the relay C.28' releases the push button P.1 which is restored to normal position by the spring S.34'. The circuit of the wire h has been already traced. The negative pole of the solenoid C.28' is connected with the wire s⁻ back to the source ZZ.

In order that the timing arm 78 (Figure 9) may not be arrested when current through the wire g fails, but may be advanced to a neutral position preparatory to a future operation; circuit to the clutch C.21 after its initial displacement, is sustained by current passing through an extension of the wire a (Figures 2, 1), a conductor of series 81 (Figure 3) at the wheel 76 (Figure 1), the bridges raised of the relay C.23, the bridge depressed of the relay C.22 to the clutch C.21, whence it passes through the wire s⁻ back to the source ZZ. The conductors 81 (Figure 3) are of the necessary arc to carry the timing arm 78 to an intermediate neutral position between two series of the b terminals in the orbit of the conductor 79 (Figure 9). In order to obviate the necessity of restoring the arm 78, in operations of addition, subtraction and division, to the normal position shown in Figure 9, preparatory to each operation, the series of b terminals are, as above described, recurrent throughout the entire orbit of the conductor 79.

In setting up a negative quantity at the accumulator arm 61', 61'', 61''' (Figure 1), the master switch 7 (Figure 2) is placed in position, —. The operation then involves the same mechanism and circuits as in setting up a positive quantity except that at the contact plate 12, circuit is closed from the positive pole of the source ZZ, to the wire i leading over the bridge 209 depressed at the relay C.14 and the bridge 101, raised, at the relay C.12, to the positive pole of the relay C.11 (Figure 1) which breaks, at the bridge 98, the circuit of the wire dr to the clutch C.5, and closes at the bridge 99, the circuit of the wire dr¹ to the relay C.5a, reversing, thereby, the motion of the members 61', 61'', 61'''. The negative pole of the relay C.11 (Figure 1) is connected through the wire s⁻ back to the source ZZ. The relay C.12 is energized by the extension of the wire dr hereinbefore traced, which leads to its negative pole. The positive pole of the relay C.12 is connected with the source ZZ, through the wire s⁺. The push button P.1 (Figure 2) is, as before depressed and the negative quantity is accumulated at the accumulator arms 61', 61'', 61''' (Figure 1).

Movement of the timing arm 78 (Figures 1, 9) is maintained, as in addition, until it reaches a neutral position between two series of b terminals, by current through the extension of the wire a passing through a conductor of series 81 (Figure 3) carried by the wheel 76 to the clutch C.21 (Figure 1).

As the accumulator advances from zero position in the accumulation of positive quantities, positive carry over is transmitted, during each successive tenth step displacement of the accumulator arms 61''', 61'' (Figure 1) and borrowing is effected at successive first step displacements in opposite direction, so long as, at the accumulator, a positive quantity be latent. Means are provided whereby the transfer clutches C.8'', C.8' at shaft 58, shall, similarly, as the accumulator advances from zero position in contraclockwise direction, in the accumulation of negative quantities, transmit a negative carry-over at each successive tenth step displacement of the accumulator arms 61''', 61'', so long as a negative quantity be latent at accumulator; and borrow at successive first step displacements in relatively opposite direction. This now will be explained.

Referring to Figure 7, the shaft 58a carries the sleeves 60a', 60a'', 60a''' which are rotated respectively by the clutches C.7a', C.7a'', C.7a''' simultaneously with the sleeves 60', 60'', 60''', (Figure 7) carried by the shaft 58 and rotated by the motor M through the clutches C.7', C.7'', C.7'''. Circuit is closed simultaneously at the bridges 73', 73a', to the clutches C.7', C.7a'; through the wires j'', ja'' to the clutches C.7'', C.7a''; and circuit is closed simultaneously, at the bridges 73''', 73a''', through the wires j''', ja''', to the clutches C.7''', C.7a''', the negative poles of the clutches C.7', C.7a', C.7'', C.7a'', C.7''', C.7a''' being all connected through the wire s⁻ with the source ZZ.

The armature of the clutch C.7a' is the wheel 62a' (Figure 7) which floats on shaft 58a and transmits motion to the sleeve 60a', through a composite idler not shown but similar to the idler 67' (Figure 1), and the differential Dja' (Figure 7), the middle member of which is fixed to the sleeve 60a'. The armature of the clutch C.7a'' is the wheel 62a'', which floats on the shaft 58a and transmits motion to the sleeve 60a'' through a composite idler similar to idler 67'' (Figure 1), and the differential D*fa*'' (Figure 7), the middle member of which is fixed to the sleeve 60a''. The armature of the clutch C.7a''' is the disk 62a''' fixed to the sleeve 60a'''.

The carry-over, at the shaft 58a, is transmitted from the sleeve 60a''' to the sleeve 60a'', by the clutch C.8a''' integral with the sleeve 60a''', the armature 63a''' floating on shaft 58a and transmission similar to the pinion 64'' (Figure 1), shaft 65'', and the pinion 66'', to the left lateral member of the differential D*fa*'' (Figure 7) which floats on the sleeve 60a''. The carry-over is in like manner transmitted from the sleeve 60a'' to the sleeve 60a', by the clutch C.8a'' fixed to the sleeve 60a'', and transmission similar to the transmission 64', 65', 66'. (Figure 1), and the differential D*fa*' (Figure 7), the left lateral member of which floats on the sleeve 60a'.

Integral with the sleeve 60a' is a clutch C.8a' (Figures 1, 7) similar to the clutches C.8a'', C.8a''' which transmits carry-over to a denominational order consisting of a single member, the armature 63a'. This order is higher than the highest order yet described and corresponds to thousands, in the present drawings. The armature 63a' carries a conductor 90 (Figures 7, 8) which governs duplicate circuits to the clutches C.8a', C.8a'', C.8a'''.

The negative pole of the clutch C.8a' is connected with the source ZZ, through the wire *s*⁻. The negative poles of the clutches C.8a'', C.8a''', C.8', C.8''', are connected with the wire *ds*⁻ leading over the lower bridge at the relay C.19 to the source ZZ.

When the calculating unit (Figure 7) is in zero position, the clutches C.8'', C.8''', are in open circuit, the circuit of the wire *d* leading to the positive contact bands 36'', 36''', being broken at the bridge 92², and the circuit of the wire *d*' to the positive contact bands 38'', 38''' being broken at the bridge 92⁴. The clutches C.8'', C.8''' may then be displaced from zero in either direction without borrowing and thereby displacing higher orders. The contact bands 36'', 36''', 38'', 38''', extend each through 36° of arc.

When the calculating unit is at zero, circuit leads to the clutches C.8a', C.8a'', C.8a''' through the wires both *da*, closed on the wire *s*⁺ leading from the source ZZ, at the bridge 92², and through the wire *da*', closed on the wire *s*⁺ at the bridge 92³. The terminals of wire *da* are in such position relatively to the positive contact bands 36a', 36a'', 36a''' which extends through 36°, that if a clutch C.8a', C.8a'', C.8a''', be displaced from zero in direction opposite to clockwise, as in the addition of positive quantities, a quantity is borrowed throughout ascending orders of the calculating unit at shaft 58a, and the armature 63a' (Figures 7, 8) is displaced 36° in direction opposite to clockwise.

The terminals of the wire *da*' are in such position relative to the positive contact bands 38a', 38a'', 38a''', which extend through 36°, that if a clutch C.8a', C.8a'', C.8a''' be displaced from zero in clockwise direction, as in the subtraction of a positive quantity, a quantity is borrowed throughout ascending orders at shaft 58a and the armature 63a' is displaced 36° in clockwise direction, (clockwise movement in Figure 8 being towards the left, because of viewpoint).

So long as operations remain within the zone of positive quantities, the armature 63a', displaced in direction opposite to clockwise, closes circuit from the wire *s*⁺ through the conductor 90, carried by the armature 63a', to the wire *d*. So long as operations be within the zone of negative quantities, the armature 63a', displaced in clockwise direction, closes circuit from the wire *s*⁺ through the conductor 90, to the wire *d*'.

When the wire *d* is closed by the conductor 90, circuit is completed to the relay C.25, the negative pole of which is connected through the wire *s*⁻ back to the source ZZ. The relay C.25 so energized retracts the plunger 91, common to the relay C.25', and closes at the bridge 92², circuit through an extension of the wire *d* to the clutches C.8'', C.8''', the contact bands 36'', 36''' at which are so placed relatively to the terminals of the wire *d*, that the clutches C.8'', C.8''' are energized at each tenth step displacement clockwise in every revolution, and at such tenth step displacement transmit a positive carry-over. At each first-step displacement in opposite direction within the zone of positive quantities the clutches C.8'', C.8''', borrow. So long as operation remains within the zone of positive quantities, the wire *d* is active.

When the wire *d*' is closed by the conductor 90, circuit is completed to the relay C.25', the negative pole of which is connected through the wire *s*⁻ back to the source ZZ. The relay C.25' so energized retracts the common plunger 91; and closes at the bridge 92⁴ circuit through an extension of the wire *d*' to the clutches C.8'', C.8''', the contact bands 38'', 38''' at which are placed relatively to the terminals of the wire *d*', that the clutches C.8'', C.8''', are energized at every tenth step displacement in every revolution opposite to clockwise, and at such tenth step displacement transmit a negative carry-over. At each first step displacement clockwise, within the zone of negative quantities, the clutches C.8'', C.8''', borrow. So long as the operation remains within the zone of negative quantities, the wire *d*' is active.

When the wire *d* is active, circuit is broken at the bridge 92³ from the wire *s*⁺ to the wire *da*', which remains open, and is closed at the bridge 92' from the wire *d* through the wire *da* to the clutches C.8a', C.8a'', C.8a''', which, so long as the operation remains within the zone of positive quantities, borrow while the clutches C.8'', C.8''' are transmitting positive carry-over; and transmit carry-over, while the clutches C.8'', C.8''', borrow.

When the wire *d*' is active, circuit is broken at the bridge 92' from the wire *s*⁺ to the wire *da*, which remains open, and is closed at the bridge 92³, from the wire *d*' through the wire *da*' to the clutches C.8a', C.8a'', C.8a''', which so long as the operation remains within the zone of negative quantities borrow while the clutches C.8'', C.8''' are transmitting negative carry-over; and transmit carry-over additively while the clutches C.8'', C.8''' borrow.

A first unit displacement as the calculating unit passes from zero position, into either positive or negative quantities, causes borrowing, as above described, at ascending clutches C.8a', C.8a'', C.8a''', which displaces the armature 63a'. Conversely, as the calculating unit returns to zero position, through either positive or negative quantities, the last unit displacement of a clutch C.8a', C.8a'', C.8a''', causes a carry-over to be transmitted to the armature 63a', which is thereby restored to normal position, throwing the wires *d*, *d*', and the clutches C.8'', C.8''' again into open circuit; and permitting the bridges 91', 91³ again to close circuit from the wire s+ through the wires both da and da', to the clutches C.8a', C.8a'', C.8a''', as they may eventually be displaced from zero.

Multiplication

The multiplicand is normally set up at the levers 1', 1'', 1''', and the multiplier at the levers 2', 2'', 2''' (Figure 2); the master switch 7 is placed in position x (+) or x (−), accordingly as the factors be similar or dissimilar in quality; and the push button P.2 is depressed. Accumulation of the resultant at the arms 61', 61'', 61''' (Figure 1) is, in principle, substantially similar to that above described, save as modified by the timing arm 78 (Figures 1, 9) which, in multiplication selectively closes circuits to the wires $b^1$–$b^9$ from the wires $a^1$–$a^9$.

Closed in multiplication by the master switch 7 through the contact plate 9, is circuit through the wire dr (Figures 2, 1), which energizes the relay C.13', and leads normally over bridges of the relays C.13', C.13 and bridge 98 depressed at the relay C.11 to the negative pole of the clutch C.5. An extension of the wire dr leads also to the negative pole of the relay C.12. Closed by the master switch 7 (Figure 2) at the contact plate 12, is circuit through the positive wire o (Figures 2, 1) which is progressively closed at the disk 40⁵ (Figures 1, 5) of the multiple transmitter 40, on the wires o', o'', o''' leading over bridges at the relays C.29', C.29'', C.29''' (Figure 2) to the levers 2', 2'', 2'''. Closed likewise by the master switch 7 at the contact plate 12, is circuit from the wire s+ to the wire w (Figures 2, 1) leading through the conductor 82 at the wheel 76 (Figures 1, 3) to the relay C.22 (Figure 1); and also circuit from the wire s+ through the wire x' (Figures 2, 1) leading through the conductor 87 at the wheel 76 (Figures 1, 3) and the wire x (Figure 1), to the positive pole of the clutch C.26 (Figure 1).

Depression of the push button P.2 (Figure 2) completes circuit through the positive wire g, which directs initial impulse through the conductor 85 (Figure 3) at the wheel 76 (Figure 1) and the bridges 49', 49'', 49''', to the relays C.2', C.2'', and C.2'''. Operation follows, the push button being held in depressed position by the solenoid C.28'' (Figure 2) as presently described.

Let it be assumed, that the timing arm 78 describes an arc of 3.6°, corresponding to a unitary space displacement of the accumulator arms 61', 61'', 61''' (Figure 1), when the timing arm 78 advances to one and to another of the terminals of the wires $b^1$–$b^9$, which may be closed on the wire a' through the conductor 79'. The terminals of the wires $b^1$–$b^9$ at their intersections with the wire $a^2$ in the orbit of the conductor 79², are at arcs twice as great; the terminals of the wires $b^1$–$b^9$ at their intersections with the wire $a^3$ are at arcs three times as great; and thus progressively, the terminals of the wires $b^1$–$b^9$ which may be closed, through the conductor 79⁹, on the wire $a^9$, being at arcs of 32.4°, nine times greater than the arcs between the terminals at which circuit may be closed by the conductor 79¹.

If, accordingly, the arc described by the arm 78 in advancing to one and to another of the intersections of the wires $b^1$–$b^9$ with the wire a', correspond to one step displacements of the accumulator arms 61', 61'', 61''' (Figure 1); the arc described by the timing arm 78 (Figure 6) in advancing to one and to another of the intersections of the wires $b^1$–$b^9$ with the wires $a^2$ being twice as great, would correspond to two step displacements of the accumulator arms 61', 61'', 61''' (Figure 1). Similarly the arc described by the timing arm 78 (Figure 6) in passing to one and to another intersection of wire $a^3$, being three times as great, would correspond to three step displacements of the accumulators 61', 61'', 61''' (Figure 1); and the arcs to and between intersections at wire $a^9$ being nine times as great, would correspond to a displacement of the accumulator arms 61', 61'', 61''' of nine steps.

Therefore, if the wire $a^3$ be closed at the lever 2' (Figure 2) and the wire $b^2$ be closed at the lever 1', the accumulator arm 61' (Figure 1) would be displaced four steps, corresponding to the numeral 4, when arrested by completion of the circuit by the conductor 79² (Figure 9) to the relay C.4' (Figure 1), as the timing arm 78 reaches the intersection of the wires $a^3$, $b^2$ (Figure 9).

Similarly, if the wire $a^3$ be closed at the lever 2'' (Figure 2) and the wire $b^6$ be closed at the lever 1''', the accumulator arm 61''' (Figure 1) would be advanced eighteen steps, when arrested at completion of circuit to the relay C.4'' by the conductor 79³, at the intersection of the wires $a^3$, $b^6$ (Figure 9). Hence, the step displacement of an accumulator arm is proportionate to the product of the serial numbers which identify the a and b circuits selected at the control levers (Figure 2) and completed at the timing arm 78 (Figures 1, 9).

Rotation of the timing arm 78, initiated by the wire g, is maintained until it reaches normal perpendicular position as represented in Figure 9, by current through wire w (Figures 3, 1) to the positive pole of the clutch C.21 (Figure 1). This circuit originates at the source ZZ and passes through the wire s+ (Figures 1, 2) contact plate 12, the wire w, the conductor 82 at wheel 76 (Figures 1, 3), the bridge at the relay C.22 (Figure 1) energized through the wire w, to the clutch C.21. The negative poles of the relays both C.21, C.22 are connected through the wires s− with the source ZZ. The purpose of the relays both C.22 and C.23, is to prevent interference of circuits through the wires g, a, and w, each of which, though in different instances, closes circuit on the clutch C.21.

Assume, consistently with the above, that the operation be, 26×23=598. In copending application Serial No. 44,159, means are disclosed whereby column shift is so effected, that the first numeral of the product 598 automatically shall fall in the hundreds column, with the factors set up at the tens and units orders of the levers 1', 1'', 1''', 2', 2'', 2''' (Figure 2). For brevity, in present illustration, the factors may, however, be set up at the hundreds and tens orders of said levers, in order that the orders of the product may properly be placed, the disks 40' and 40⁵ being shown in Figures 4 and 5 in position to accommodate such operation.

When the multiplicand 26 has been multiplied by 2, the first numeral of the multiplier, and immediately before the timing arm 78 reaches the normal position shown in Figure 9, circuit is closed by the conductor 87 at the disk 76 (Figures 1, 3) through the wires x', x (Figures 2, 1) to the positive pole of the clutch C.26 fixed to the shaft 53 (Figure 1). This circuit originates at the source ZZ, and passes through the wire s+

(Figures 1, 2) the contact plate 12 (Figure 2), wire $x'$ (Figures 2, 1), conductor 87 (Figures 1, 3), and wire $x$, to the clutch C.26 (Figure 1) whence it passes through the wire $s-$ over the bridge 96 at the relay C.10, back to the source ZZ.

The clutch C.26 so energized and in continual rotation, clutches the transmitter 40 which floats upon the shaft 53, and operating on the wires $o'$, $o''$, $o'''$ (Figures 1, 2, 5) as presently described, shifts current from the wire $o$, after the first partial operation, from the lever $2'$ closed on the wire $a^2$ corresponding to the first numeral of the multiplier, to the lever $2''$, closed on the wire $a^3$ corresponding to the second numeral of the multiplier. Simultaneously, the transmitter 40 (Figure 1) switches at the disk $40'$ (Figure 4) the current of the wire $e'$ together with the current of the wire $c'$, both closed by the lever $l'$ (Figure 2) and corresponding to the first numeral of the multiplicand, from the relays C.2', C.4', respectively, to the relays C.2'', C.4''. In similar manner, at the disk $40'$ (Figure 4) current of the wire $e''$, together with current from the wire $c''$, closed by the lever $l''$ and corresponding to the second numeral of the multiplicand, are switched respectively from the relays C.2'', C.4'', to the relays C.2''', C.4''' (Figure 1).

Through the action of the transmitter 40, the operation of multiplication is accordingly shifted to the next lower orders of the calculating unit corresponding to next lower denominations.

The disk $40^5$ carries at its lower face (Figures 1, 5), a conductor 41 to which is attached a contact 42. Closed on the conductor 41 is the wire $o$ (Figures 5, 1). Closed successively by the contact 42, as the disk $40^5$ is rotated, are the wires $o'$, $o''$, $o'''$, which lead respectively over the upper bridges at the relays C.29', C.29'', C.29''' (Figure 2) normally closed to the levers $2'$, $2''$, $2'''$. The arc of the conductor 87 at the wheel 76 (Figures 1, 3) is exactly sufficient to sustain current to the clutch C.26 (Figure 1) while the clutch C.26 displaces the transmitter 40 from the position at which the contact 42 (Figure 5) closes on the wire $o'$, to successive positions at which it closes on the wire $o''$, and then on the wire $o'''$. Circuit is thereby shifted downwards after the first partial multiplication, from the lever $2'$ (Figure 2) and wire $a^2$ corresponding to the first numeral of the multiplier, into connection with the lever $2''$ and the wire $a^3$ corresponding to the second numeral of the multiplier and eventually, were there three numerals in the multiplier, likewise to an $a$ wire closed at the lever $2'''$.

The disk $40'$ (Figures 1, 4) carries a series of concentric conductors $16^1-16^6$. On these conductors at the faces of the disk $40'$, float terminals of the several wires $c'$, $e'$, $c''$, $e''$, $c'''$, $e'''$, through which, in normal position current is directed to the relays C.4', C.2', C.4'', C.2'', C.4''', C.2''' (Figure 1) through extensions of the wires $c'$, $e'$, $c''$, $e''$, $c'''$, $e'''$, leading respectively from the opposite extremities of the concentric conductors $16^1-16^6$. These last said terminals are spaced at arcs, which permit current through the several wires $c'$, $e'$, $c''$, $e''$, $c'''$, $e'''$, to be switched respectively, to the corresponding relays of next lower orders, as the clutch C.26 (Figure 1) displaces progressively the transmitter 40.

Circuit $o$ being shifted, by the transmitter 40 at the disk $40^5$ from the lever $2'$ (Figure 2) closed on the wire $a^2$ corresponding to the first numeral of the multiplier 23, to the lever $2''$ closed on the wire $a^3$ corresponding to the second numeral thereof, and the $c$ and $e$ wires having been switched at the disk $40'$ to the corresponding relays of next lower orders, permitting the deflected levers $l'$, $l''$, to operate respectively thereon; the wheel 76 (Figure 1) revolving, again momentarily completes, at the conductor 85 (Figures 1, 3) circuit through the wire $g$ (Figure 1) to the relays C.2'', C.2'''; and the multiplicand 26 is multiplied by the numeral 3, the push button P.2 (Figure 2) being held depressed by the solenoid C.28''.

The circuit of this solenoid C.28'' originates at the source ZZ (Figure 1), and passes through the wire $o$ (Figures 1, 2), the conductor 41 at the disk $40^5$ (Figures 1, 5), the wire $y$ (Figures 1, 2), the bridge $32''$, the solenoid C.28'' (Figure 2), and thence back through the wire $s-$ (Figures 2, 1) to the source ZZ. Circuit to the solenoid C.28'' remains active, until multiplication is finally completed, when, after successive shifts at the transmitter 40 (Figure 1), the wire $y$ (Figure 5) is thrown into open circuit, as current from conductor 41 advancing, fails. Circuit to the solenoid C.28'' is thereby broken and the push button P.2 is restored to normal position by the action of a spring S.34'' (Figure 2).

The second partial operation having been initiated by impulse through the wire $g$ as circuit is again completed through the conductor 85 (Figure 3) to the relays C.2'', C.2''' (Figure 1), the wheel 76 (Figure 1), and the timing arm 78 enter on a second revolution; the wire $a^3$ corresponding to the second numeral 3 of the multiplier, in turn operating on the wires $b^2$, $b^6$, corresponding to the multiplicand 26. As the timing arm 78 (Figures 1, 6), advancing, closes through conductor $79^3$, the wire $a^3$ upon the wire $b^2$, the accumulator arm $61''$ (Figure 1) is arrested at an advance of six steps, which added to its original net displacement of two steps give the accumulator arm $61''$ an angular displacement of eight steps. The accumulator arm $61'''$ is in turn arrested, as the timing arm 78 reaches the terminals of the wires $a^3$, $b^6$ (Figure 6) and, having described a complete revolution, rests at a net displacement of eight steps, the ten units corresponding to the complete revolution of the accumulator arm $61'''$ being transmitted as carry-over to the accumulator arm $61''$, which is thereby advanced an extra step. The final displacement of the accumulator arms $61'$, $61''$, $61'''$ reflects accordingly, 598, the product. This quantity may be transferred to recording mechanism as disclosed in copending application Serial No. 44,159.

Should a zero appear in the multiplier, and consequently a partial multiplication be suspended; transmission of motion from the shaft 53 (Figure 1) to the shaft 58, is interrupted, by breaking the circuit of the wire $h$ to the clutch C.5. This is accomplished by means of the relay C.1. Said relay C.1 is in a circuit which originates at the source ZZ and passes through the wires $s+$, $o$, and a wire $o'$, $o''$, $o'''$ (Figures 1, 2), already traced, progressively to the levers $2'$, $2''$, $2'''$ (Figure 3) as hereinabove described, and thence through the wire $a^0$ over the bridge at the relay C.3 (Figure 1) to the positive pole of the relay C.1, the negative pole whereof is connected through the wire $s-$ back to the source ZZ. If the wire $a^0$ be closed at the lever $2'$, $2''$, $2'''$ (Figure 2) which at the time be receiving current from a wire $o'$, $o''$, $o'''$, the relay C.1 (Figure 1) breaks at the bridge carried at the upper extremity of its plunger, circuit through the wire $h$ to the clutch C.5, or, as it may be in negative multiplication, to the clutch C.5a. If there be successive zeros in the multiplier, action at the relay C.I, is repeated.

The relay C.3 shown in Figure 1, is active, only when a quantity stored in a conservator enters as a factor, as described presently herein.

In order to insure the presence of the arm 78 in normal perpendicular position as shown in Figure 9, when initiating an operation in multiplication, the push button P.4 (Figure 2) is manually depressed. It is held in such position by the solenoid C.28⁴ on which circuit is thereby closed and which is held in stick, through a current which, originating at the source ZZ (Figure 1) passes through the wire s⁺ (Figures 1, 2), bridge at the push button P.4 (Figure 2), the wire z (Figures 2, 1), conductor 83 (Figure 3), at the wheel 76 (Figure 1) to the clutch C.21 and to the solenoid C.28⁴ (Figure 2), the negative poles whereof, are connected through the wire s⁻ with the source ZZ (Figure 1). The clutch C.21, so energized, transmits motion through the transmission 74, 75, 76, 77, until, as the timing arm 78 reaches normal perpendicular position (Figure 9), circuit to the clutch C.21 and the solenoid C.28⁴ is broken at the conductor 83 (Figure 3), arresting thereby the timing arm 78 in normal perpendicular position (Figure 9), and releasing the push button P.4 (Figure 2).

In order to insure that the transmitter 40 (Figure 1) be restored to normal position, the conductor 43 (Figure 5) carried at the lower face of the disk 40⁵ (Figure 5), closes circuit on the positive pole of the clutch C.26 (Figure 1). When the shifts of circuit incident to the operations of multiplication have been completed, such final shift carries the extremity of the conductor 43 into contact with the fixed terminals 44. The circuit so closed by the conductor 43 originates at the source ZZ (Figure 1), and passes through the wire s⁺ and the conductor 43 (Figure 5) to the positive pole of the clutch C.26 (Figure 1), the negative pole whereof, as already stated, being connected, through the wire s⁻, back to the source ZZ. The clutch C.26 so energized, clutches the transmitter 40 and rotates it onward to normal position, the arc of the conductor 43 (Figure 5) being such that when the transmitter reaches normal position, circuit to the clutch C.26 fails.

In operations of multiplication, when a negative factor enters with a positive, the master switch 7 (Figure 2) is placed in position x (—). In this position the master switch 7 closes the same circuits, as in multiplication of quantities of similar quality, except that through the wire t a positive current is closed at the contact plate 12 (Figure 2), to the relay C.11, over the bridge 200, and the bridge 101 at the relay C.12, which is energized, as hereinbefore described, by the wire dr. The relay C.11 so energized switches at the bridge 99, current from the wire dr to the clutch C.5a which transmits motion in direction opposite to clockwise, as hereinbefore described, to the accumulator arms 61', 61'', 61''' (Figure 1). The operation is similar in all particulars to the multiplication of two positive quantities or as it might be of two negative quantities, except that the direction of motion of said arms is reversed, carry-over, as heretofore described, being effected by the transfer clutches C.8', C.8'', during each tenth step and "borrowing" during each first step, in whichever direction from zero position the accumulator be displaced.

The product is automatically recorded and its quality distinguished, by mechanism disclosed in co-pending application Serial No. 44,159. The relay C.29 (Figure 2) whose negative pole is connected with the wire s⁻, serves to close circuit from the positive wire w over the bridge 33'' at the push button P.2 to the solenoid C.49 which is an element in the recording mechanism, conditioned when P.1 is depressed, and rendered active by a circuit closed by the bridge 34'' at contacts shown without wiring, when the push button, at end of computation, be released. Similar circuits at the push buttons P.1, P.3, are similarly operative in the computations they respectively control.

Division

A dividend having been developed at the accumulator 61', 61'', 61''' (Figure 1), the divisor is set up at the levers 1', 1'', 1'''. Assume the operation 598÷26=23, in which the factors both are positive. In copending application Serial No. 44,159, means are provided whereby the divisor 26 may be set up at the levers 1'', 1''' corresponding to tens and units, the operation then being automatically shifted so as to cause the divisor to operate first upon the hundreds and tens orders of the dividend. To like effect, in order that the divisor 26 first operate upon the hundreds and tens orders of the dividend 598, the divisor 26, for purposes of present illustration, may be manually set up at the levers 1', 1'' (Figure 2), the disks 40', 40⁵ being shown in Figures 5 and 6, in position to accommodate the operation.

The lever 1' is deflected so as to close on the wire b² (Figure 2); and the lever 1'' is deflected so as to close on the wire b⁶.

The master switch 7 (Figure 2) is, for reasons which will presently appear, placed in position ÷(+) or +(—), according to the positive or negative quality of the divisor, irrespective of the quality of the dividend which conceivably may be unknown; and the push button P.3 is depressed, imparting to the relays C.2', C.2'', C.2''' (Figure 1) an initial impulse through the wire g closed at the wheel 76 by a conductor of the series 86 (Figure 3).

Displacement of the master switch 7 (Figure 2) as above specified, closes at the contact plate 9, circuit of the wire s⁻ from the source ZZ (Figure 1), to the wire u (Figures 2, 1) leading through a conductor of series 89 at the wheel 76 (Figures 1, 3) over the bridge 94 when raised, at the relay C.10, and over the bridge 98 or the bridge 99 at the relay C.11, to the clutch either C.5a or C.5, according to the quality of the dividend, as presently explained. The wire u also closes circuit at the bridges 94, 93, when raised, to the relay C.10, which it may hold in stick; and at the bridge 96 raised, may close circuit to the negative pole of the relay C.30 (Figure 2) which is operative in developing the quotient, as presently described.

Closed by the master switch 7 at the contact plate 10 (Figure 2), is the wire v leading from a comparator presently described, to the wire dp (Figure 1) which may impart initial impulse to the relay C.10.

Closed by the master switch at the contact plate 12 (Figure 2) is circuit from the source ZZ through the wire s⁺ to the wire a (Figures 2, 1) leading, as in addition and subtraction, to the timing arm 78 (Figures 1, 9) and to the relay C.23, and clutch C.21 (Figure 1).

Closed likewise by the master switch 7 at contact plate 12 (Figure 2), is circuit from the wire s⁺ to the wire x (Figures 2, 1), which leads through the conductors 88 (Figures 1, 3) to the clutch C.26 (Figure 1); and closed at the contact plate 12, is circuit through the wire o (Figures 2, 1).

The push button P.3 (Figure 2), when depressed closes at the bridge 32''' carried by its plunger, circuit to the solenoid C.28''', which is in the circuit of the wire s⁻ and of the wire y already traced and holds the push button P.3 in depressed position, until division be completed, current to the solenoid C.28''' then being broken as the wire y is thrown into open circuit, as described in multiplication, at the conductor 41 (Figure 5). The push button P.3 is then restored to normal position by the spring S.34''' (Figure 2).

Depression of the push button P.3 imparts initial impulse to the relays C.2', C.2'', and the disk 76. An operation in the nature of subtraction follows, after which it becomes necessary to determine whether the remainder be less than the divisor, or whether further subtraction may follow at the higher columns. This is accomplished by the comparator which now will be given a preliminary description as related to the levers 1', 1'', 1''', its operation when connected with a conservator being hereinafterwards disclosed.

The accumulator arms 61', 61'', 61''' (Figure 1) carry, each at its extremity a terminal 119', 119'', 119''' (Figures 1, 14, 17) closing circuits of the comparator, whereby current flows from the negative pole of the source ZZ (Figures 1, 14) through the wire s⁻, to a typical conductor 118', for example, at the base of the accumulator arm 61', and to the terminal 119' fixed at the other extremity of said accumulator arm, being placed at the left as indicated in Figures 1, 7. The terminal 119' may close circuit according to the angular position of the accumulator arm 61' on any one of the contacts 120⁰–120⁹, which are wired respectively to corresponding terminals 121⁰–121⁹ at the sector 122'.

The sector 122' and the sectors 122'', 122''' fixed respectively to the shafts 3', 3'', 3''' (Figures 2, 14, 17) of the levers 1', 1'', 1''', are similar in construction and in purpose. Each sector carries an isolated contact such as 123' (Figure 17), closed in normal position upon a terminal similar to the terminal 121⁰ and capable of engaging the other terminals similar to the terminals 121¹–121⁹ when the sectors are respectively displaced by the levers 1', 1'', 1'''. The sector 122' carries also a conductor 124' closing, when in normal position, on the terminals 121¹–121⁹; and the sectors 122'', 122''', carry the conductors 124'', 124''', similar thereto.

When the lever 1' (Figures 1, 11) is deflected the position of the isolated contact 123', relatively to the terminals 121⁰–121⁹, corresponds to the b wire selected as a numeral of the divisor, at the lever 1'. Assuming that the divisor be 26, and the lever 1' be closed on the wire b², the isolated contact 123' would then close on the terminal 121². If the first numeral of a dividend or a remainder, were equal to the first numeral 2 of the divisor, the accumulator arm 61' (Figure 14) would then close circuit at the contact 120², through the wire p², to the terminal 121² and the isolated contact 123'. If the first numeral of a dividend or remainder were greater than the first numeral 2 of the divisor, for example, 3; the accumulator arm 61' would close circuit at the contact 120³ through the wire p³ and terminal 121³ to the conductor 124', whence the current is short-circuited, through the wires v', v, dp, closed by the master switch 7 at the contact plate 10, to the relay C.10, and clutch C.5a; and a subtraction follows, a single excess unit in the dividend or remainder at a higher denominational order, being greater than any possible divisor at all columns therebelow.

If the first numeral of the dividend or remainder were less than the first numeral of the divisor, for example, 1; then the circuit closed by the accumulator arm 61' (Figure 17) at the contact 120', through the wire p', to the terminal 121' would connect neither with the isolated contact 123' nor with the conductor 124'; no current would flow through the accumulator arm 61' to the relay C.10, and clutch C.5a; and the shafts 58, 58a are not revolved.

If again, the first numeral in the dividend or remainder were equal to the first numeral of the divisor, to wit 2, current would flow from the source ZZ, through the wire s⁻, the terminal 117', the conductor 118', the accumulator arm 61', the terminal 119', the contact 120², the wire p², to the terminal 121², and through the isolated contact 123' over the wire t' to the conductor 118'', the accumulator arm 61'' and the terminal 119''. If the second numeral of the dividend or the remainder be greater than the second numeral of the divisor; circuit is closed by the accumulator arm 61'' through a wire q⁰–q⁹ onto the conductor 124'' at the sector 122'', whence current flows through the wires v'', v, dp, to the relay C.10 and clutch C.5a. If the second numeral of the dividend or the remainder be less than the second numeral of the divisor; circuit is closed neither on the isolated contact 123'' nor the conductor 124'', and current fails. If the second numerals of the dividend and the divisor be equal, circuit is closed through the isolated contact 123'', over the wire t'' to the terminal 117''', the conductor 118''', the accumulator arm 61''', to the terminal 119''', at the lowest order; where again, the numeral of the dividend or remainder may be larger than the corresponding numeral of a divisor and circuit be closed, on the conductor 124''', and current flow through the wires v''', v, dp, to the relay C.10, and the clutch C.5a. Should the numeral of the dividend or remainder be smaller than a corresponding numeral of a divisor, here again, circuit would close on neither the conductor 124''' nor on the isolated contact 123''' and current to the relay C.10, and the clutch C.5a, would fail.

Be it assumed, however, that the numeral of the divided or remainder reflected at the accumulator arm 61''' be equal to the corresponding numeral of the divisor. Current would then flow through the isolated contact 123''', the wire t''', the wire v, contact plate 10 (Figures 3, 14), wire dp (Figures 3, 1, 14), to the negative poles of the relay C.10 and clutch C.5a.

The positive pole of the relay C.10 (Figure 1) is connected through the wires s+ with the source ZZ. When circuit be completed to the relay C.10 over the wires v, dp, from any order of the comparator (Figure 14), the relay C.10 closes over the bridge 99 at the relay C.11, in the present example the dividend being positive, circuit of the wire dp to the negative pole of the clutch C.5a whose positive pole is connected through circuit of the wire h, already traced, back to the source ZZ (Figure 1). A subtraction of the divisor from the dividend or the remainder follows, in manner hereinbefore described.

The current from the comparator (Figure 14) through the wires v, dp (Figures 14, 1) imparts only an initial impulse to the relay C.10; since circuit through the wires $v$, $dp$, is forthwith broken, as the accumulator arms 61', 61'', 61''' are displaced. The action of the relay C.10, and clutch C.5a is however sustained by circuit through the wire $u$ which is closed at the bridges 93, 94, when the relay C.10 retracts its plunger. This circuit originates at the source ZZ (Figure 1) and passes through the wire $s^-$ (Figures 1, 2), the contact 9 at the master switch 7 (Figure 2), the wire $u$ (Figures 2, 1), a conductor of the series 89 at the wheel 76 (Figures 1, 3), the bridges 94, 93 (Figure 1), the relay C.10, and thence through the wire $s^+$ back to the source ZZ. The extension of the wire $u$ which leads from the bridge 94 over the bridge 99 at the relay C.11, sustains circuit to the clutch C.5a.

Returning to the operation $598 \div 26$, the remainder, after the first subtraction, is 338. The first two numerals 33 of the remainder permit of subtraction by the divisor 26; and current being again short-circuited, through the wires $v$, $dp$, to the relay C.10, and clutch C.5a, a second subtraction follows, as circuit is again closed, through the wire $g$ at a conductor 86 (Figure 7) to the relays C.2', C.2'' (Figure 1).

In these successive operations, movement of the timing arm 78 is maintained until it reaches a neutral point between two series of $b$ terminals (Figure 9) by circuit of the wire $a$ to the clutch C.21 (Figure 1), closed by conductors of the series 81 (Figures 3), as in operations of addition and subtraction.

At the termination of the second subtraction, the quantity in the first order of the divisor is exhausted; a first numeral 2 being developed in the quotient, to be reflected as presently described. The remainder is reduced to 78; and the accumulator arm 61' closes circuit to the terminal 121⁰, whence circuit is completed neither to the wire $v$ nor to the wire $t'$. Current to the relay C.10 and clutch C.5a fails; and subtraction of the divisor must be shifted to lower denominational orders.

The arc of the conductors 89 (Figure 3) is such, that the circuit through the wire $u$ which sustains the relay C.10, and clutch C.5a (Figure 1) following an initial impulse, through the wires $v$, $dp$, is interrupted during the passage of the arm 78 from the terminals of the wire $b^9$ (Figure 9) to a neutral position between series; permitting, thereby the relay C.10 (Figure 1) to release its plunger, between successive subtractions, unless the accumulator arms 61', 61'', 61''' have, in the meantime, been arrested at contacts which again close circuit to the relay C.10 through the wires $v$, $dp$. If at the termination of a subtraction, the remainder permits of further subtraction at the same columns, circuit remains closed to the relay C.10 through the wires $v$, $dp$. If the remainder does not permit of further subtraction at these columns, the plunger of the relay C.10 is released, and closes at bridge 96 (Figure 1), circuit to the negative pole of the clutch C.26. As the arm 78 passes from a terminal of the wire $b^9$ to a neutral position between series, circuit is closed by a conductor of series 88 (Figure 3) through the wire $x$ (Figures 2, 1) already traced, to the positive pole of the clutch C.26 (Figure 1), completing, in the event the plunger of the relay C.10 be so released, circuit to the clutch C.26. So energized, the clutch C.26 clutches the transmitter 40 and shifts, as in multiplication, the circuits of the $c$ and $e$ wires to the relays of lower orders; and permits, thereby, the divisor established at the levers 1', 1'', in the present illustration, to operate respectively on the tens and units orders of the mechanism, having passed from the hundreds and the tens; the wires $e'$ $c'$ to relays C.2', C.4', being thrown into open circuit at the disk 40' (Figures 1, 4).

The divisor in the present example being 26, and the remainder now being 78, three subtractions are permitted before an eventual second shift of circuits. The remainder 78 is reduced to zero by such three subtractions; and 3 appears as the last numeral in the quotient consistently with the equation $598 \div 26 = 23$. As all the accumulator arms 61', 61'', 61''' (Figure 13) are then at zero, current to the relay C.10 and clutch C.5a fails.

To provide for dividends not exactly divisible by their divisors, lower orders may be provided, as disclosed in copending application Serial No. 44,159, which carry the quotient into decimal fractions, before circuits through the $c$, $e$, wires finally may fail.

When the transmitter 40 (Figure 1) switches the $c$, $e$ wires downward onto C.4, C.2 relays of lower orders, it is necessary to shift progressively the $p$, $q$, $r$ wires of the comparator (Figure 14) upwards to connections at the levers where the divisor is established, in the present example, to connections at the levers 1', 1'' (Figure 2); in order that the remainder 78 may be compared with the divisor 26. The wires $p^0$–$p^9$ leading from the accumulator arm 61' are accordingly, switched into open circuit, the wires $q^0$–$q^9$ leading from the accumulator arm 61'' are switched to the terminals 121⁰–121⁹ at the lever 1', and the wires $r^0$–$r^9$ leading from the accumulator 61''' are switched to the terminals 127⁰–127⁹ at the lever 1''. This is automatically accomplished by means of conductors carried on the disks 40², 40³, 40⁴, shown in Figures 1 and 14.

The wires $p^0$–$p^9$ are shown in Figure 14 as carried in the cable $pp$ over the fixed benches 130, 130', and the conductors 151⁰–151⁹ at the disk 40² to their corresponding terminals 121⁰–121⁹ at the lever 1'. The wires $q^0$–$q^9$ are similarly shown as carried by the cable $qq$ over the benches 135, 135', and the conductors 152⁰–152⁹ at the disk 40³ to the terminals 127⁰–127⁹ at the lever 1''; and the wires $r^0$–$r^9$ are shown as carried in the cable $rr$ over the benches 141, 141' and conductors 153⁰–153⁹ at the disk 40⁴, to the terminals 129⁰–129⁹ at the lever 1'''. At the first shift of $e$, $c$, and $o$ circuits above described, the disk 40², likewise displaced, throws the wires $p^0$–$p^9$ into open circuit at the bench 130; the circuits of wires $q^0$–$q^9$ are switched at the benches 136, 136' at the disk 40³, and carried in the cable $pq$, into connection with the $p^0$–$p^9$ wires carried by the cable $pp'$ and leading to the terminals 121⁰–121⁹ at the lever 1'; and the circuits of the wires $r^0$–$r^9$ are similarly switched at the benches 142, 142' at the disk 40⁴ and carried in the cable $qr$, into connection with the $q^0$–$q^9$ wires carried by the cable $qq'$, leading to the terminals 127⁰–127⁹ at the lever 1''. At the same time, circuit from the source ZZ through the negative wire $s^-$ to the accumulator arm 61' is broken at the conductor 131, and is closed from the wire $s^-$ through the conductor 137 to the accumulator arm 61''. The wire $t'$ leading from its contact at the lever 1' is broken to the accumulator arm 61'', at the conductor 137; and is switched by the conductor 144 to the accumulator arm 61'''. Circuits are thereby so shifted, that the divisor established at the levers $1'$, $1''$, for example, may be compared with the remainder latent at the accumulator arms $61''$, $61'''$. A second shift would throw the wires $q^0$–$q^9$ into open circuit at the benches $136$, $136'$ and the wires $r^0$–$r^9$ carried in the cables $pr$, $pq$, into connection with the wires $p^0$–$p^9$ leading to the terminals $121^0$–$121^9$ at the lever $1'$. At such second shifts, circuit of the wire $s^-$ would be broken at the conductor $137$ to the accumulator arm $61''$; and would be closed by the conductor $144$ to the accumulator arm $61'''$, as it breaks the circuit of $t'$. Circuits thereby are so shifted as to compare a divisor set up at the lever $1'$, with a dividend or remainder latent at the accumulator arm $61'''$.

At the first shift of comparator circuits, when the wires $r^0$–$r^9$ which lead from the accumulator arm $61'''$, are switched to the terminals $127^0$–$127^9$ at the lever $1''$ and the wire $t'''$ is thrown into open circuit; then in order to establish a circuit from the wire $t''$, which would be active did the numeral of the dividend or remainder latent at the accumulator arm $61'''$ equal the numeral of the divisor at lever $1''$, the conductor $159$ carried by the disk $40^4$ closes the wire $t''$ at the contacts $160$ through the wire $vt''$ to the wire $v$. At the second shift of comparator circuits, when the wires $r^0$–$r^9$ lead to the terminals $121^0$–$121^9$ and wire $t''$ is thrown into open circuit; then in order to establish circuit from the wire $t'$, which would be active did the numeral of the dividend or remainder latent at the accumulator arm $61'''$ equal the numeral of the divisor at lever $1'$, the conductor $161$ carried by the disk $40^3$ closes the wire $t'$ at the contact $162$ through the wire $vt'$, to the wire $v$.

It has been assumed that the quantity in the highest order of the dividend or remainder, is reduced to zero, before circuits are shifted by the transmitter $40$ (Figure 1). A numeral may, however, remain in such highest order or subsequent higher orders, after a shift of circuits; and must be subject to the subtractions which ensue. Provision for such contingency, now will be described.

At the first shift of circuits by the transmitter $40$ (Figure 14), circuit through the wire $s^-$ is broken at the fixed terminal $132$, disk $40^2$, but is switched by the conductor $131$ at the fixed terminals $133$, $133'$, to an extension $as'$ leading to a terminal at which circuit may be closed by the relay C.$34'$. The disk $40^2$ revolving, carries the contact plate $155$ attached to the periphery of the disk $40^2$, to the terminals $156$ and closes circuit from the wire $as'$, to the extension of the wire $s^-$ leading to the accumulator arm $61'$ as circuit to this extension of the wire $s^-$ is broken at the terminals $132$, $132'$ and the circuits of the wires $p^0$–$p^9$ are broken at the bench $130$. The negative pole of the relay C.$34'$ is connected with the contact $120^0$ (Figure 17); its positive pole, with the wire $s^+$. The circuit so closed originates at the source ZZ and passes through the wire $s^-$, (Figure 14), the conductor $131$, the wire $as'$, the contact plate $155$, extension of the wire $s^-$, conductor $118'$, the accumulator arm $61'$, contact $120^0$, the relay C.$34'$, and thence through the wire $s^+$ back to the source ZZ. If, when circuit be shifted by the transmitter $40$ (Figure 1), the accumulator arm $61'$ be at zero, circuit is completed to the relay C.$34'$ which retracting its plunger breaks, at the bridge thereto attached, circuit with the terminal of wire $as'$.

If, on the contrary, a numeral exists in the highest order of the remainder, after shift of the divisor to lower decimal orders, and the accumulator arm $61'$ does not close circuit at the contact $120^0$ to the relay C.$34'$; the plunger thereof remains released, and closes circuit at its bridge, through the wire $av'$ to the wire $v$, and thence through the wire $dp$ to the relay C.$10$, as already traced. The current so passing through the wires $av'$, $v$, $dp$, energizes the relay C.$10$, and prevents a further shift of circuits by the transmitter $40$ (Figure 1), until subtraction of the divisor from the remainder, reduces to zero the numeral in the highest order of the remainder and carries the accumulator arm $61'$ back to zero.

The circuit which may so be closed by the relay C.$34'$ originates at the source ZZ (Figure 14); and passes through the wire $s^-$; as already traced, the bridge at the plunger of the relay C.$34'$, the wires $av'$, $v$, $dp$, already traced, to the relay C.$10$ and thence through the wire $s^+$ back to the source ZZ.

If the accumulator arm $61''$, at the next lower order, were to reflect a numeral in the remainder, after shift of circuits to orders therebelow; the wire $as''$ closed at the terminals $140$, $140'$ (Figure 14) would in similar manner, operate upon the relay C.$34''$, when, at the second shift of circuits by the transmitter $40$, the contact $159'$ carried at its periphery by the disk $40^3$ closes, at the terminals $158$, circuit to the accumulator arm $61''$ through contact $158$ and the extension of the wire $t'$. So long as the accumulator arm $61''$ were not restored to zero position by subtraction of the divisor from the remainder, circuit would be closed at the bridge depressed on the plunger of the relay C.$34''$; and current would flow from the wires $as''$, $av''$, through the wires $v$, $dp$, to the relay C.$10$; and this circuit would be broken only when the accumulator arm $61''$ is restored to zero, where it closes circuit to the relay $34''$.

If the dividend reflected by the accumulator arms $61'$, $61''$, $61'''$ (Figure 2) be a negative quantity, the direction of their movement must be clockwise, in response to the subtractions of the divisor, which ensue. This is automatically accomplished through the relays C.$11$, C.$12$ (Figure 1), as now will be described.

In division, the wire $dr$ being inactive, the plunger of the relay C.$12$ is released; and may close, at the bridge $101$ (Figure 1) thereto attached, circuit through the wire $d'$; to the relay C.$11$. When the dividend is positive, circuit through the wire $d'$ is open at the conductor $90$ (Figures 1, 8), as hereinbefore described; and the plunger of the relay C.$11$ (Figure 1) being released, current flows through the wires $dp$ and $u$ over the bridge $99$ at the relay C.$11$ to the clutch C.$5a$, resulting in subtraction at the accumulator arms $61'$, $61''$, $61'''$, with motion in direction opposite to clockwise. When the quantity constituting the dividend is negative, circuit is closed at the conductor $90$ as hereinbefore described, through the wire $d'$, already traced, over the bridge $101$ at the relay C.$12$, to the positive pole of the relay C.$11$, the negative pole whereof, as hereinbefore described, being connected, through the wires $s^-$, back to the source ZZ. The relay C.$11$ so energized contracts its plunger, breaking at the bridge $99$ the circuits of the wires $dp$, $u$ to the clutch C.$5a$; and switches, at the bridge $98$, the circuits of the wires $dp$, $u$ to the clutch C.$5$. Motion in clockwise direction is thereby transmitted to the accumulator arms 61', 61'', 61''', and to the clutches C.8'', C.8''' at which the action of transfer mechanism, hereinbefore described, permits of operation exactly similar to the subtractions of the divisor from a positive dividend, save that the motion of the accumulator arms 61', 61'', 61''' is reversed.

The dividend and remainders being negative quantities, the angular step displacement of the accumulator arms 61', 61'', 61''', must now read from zero to the left, in order to permit the comparator (Figure 14) correctly to determine when the remainders are reduced to less than the divisor; and shift of circuits be duly effected by the transmitter 40 (Figure 1). This is accomplished by means of the relay C.24 (Figures 1, 17), which is provided with a trifurcated plunger with bridges attached to each of its three branches. Extending from the contacts $128^1$–$128^9$ at the accumulator arm 61''' to the terminals at the left branch of the relay C.24, are the wires $r^1$–$r^9$ (Figures 1, 14) shown as carried in the cable $rr$. The wires $q^1$–$q^9$ shown as carried in the cable $qq$ are similarly extended from their contacts $126^1$–$126^9$ at the accumulator arm 61'', to terminals at the middle branch of the coil C.24; and the wires $p^1$–$p^9$ carried in the cable $pp$ are shown as extended from the contacts $120^1$–$120^9$ at the accumulator arm 61' to terminals at the right branch of the relay C.24. At the opposite sides of the several branches are terminals from which the $p$, $q$, and $r$ wires are extended through the transmitter 40 (Figure 1), to their respective terminals at the sectors 122', 122'', 122''' (Figures 2, 14). The wires $p^0$, $q^0$, $r^0$, extend to the terminals $121^0$, $122^0$, $129^0$, without passing over bridges of the relay C.24.

The relay C.24 (Figure 1) is in the circuit of the wire $d'$ already traced, its negative pole being connected through the wire $s^-$, back to the source ZZ. When, as already explained, the dividend is a positive quantity, circuit is not closed by the switch 99 (Figure 8) on the wire $d'$; and the relay C.24 accordingly is not energized. When, on the other hand, the dividend be negative, circuit is closed through the wire $d'$; and the plunger of the relay C.24 is retracted. When the dividend is a positive quantity and the plunger of the relay C.24 is not retracted; circuit may be closed from the contacts $120^1$–$120^9$, for example, by the accumulator arm 61', through the wires $p^1$–$p^9$ respectively, over the bridges carried by the right branch of the plunger of the relay C.24 to the terminals $121^1$–$121^9$ at the lever 1'. When the dividend is negative and the wire $d'$ active, the plunger of the relay C.24 is retracted; the circuits from the contacts $120^1$–$120^9$ closed by the accumulator arm 61' are transposed, and the wires $p^1$–$p^9$ of complementary ordinal number are switched to the terminals $121^1$–$121^9$ (Figure 17). The circuit of the wire $p^0$ remains connected with the terminal $121^0$. The circuit from the contact 120' to the terminal 121', for example, is broken at the lowest bridge on the right branch of the relay C.24, and closed at the highest bridge thereon, to the terminal $121^9$. Circuit from the contact $120^2$ is similarly switched from the terminal $121^2$, to the terminal $121^8$. The operation is similar at all branches of the plunger; and the circuits through all the $p$, $q$, $r$ wires are simultaneously switched to their respective complementary terminals at the sectors 122', 122'', 122'''. The comparator is then in a condition to determine when, in division of negative quantities, the remainder is reduced to a quantity less than the divisor.

The quotient is reflected at the quotient arms 27', 27'', 27''' (Figure 2), corresponding respectively to hundreds, tens and units and rotated through the action of the solenoids C.31', C.31'', C.31'''. The relay C.30 is in a circuit which originates at the source ZZ and passes through the wire $s^-$ (Figures 1, 2), contact plate 9 at the master switch 7, the wire $u$, already traced, over the bridge 96 when raised at the relay C.10, the relay C.30, the wire $g$ (Figures 2, 1), the bridge 95 when raised at the relay C.10 (Figure 1), a conductor of series 86 at wheel 76 (Figure 3), the highest bridge at the push-button P.3 (Figure 2), and through the wire $s^+$ (Figures 2, 1) back to the source ZZ (Figure 1).

When the push button P.3 (Figure 2) is depressed at the beginning of division, assuming that the divisor be not greater than the dividend and that circuit be not broken at the bridges of the relay C.10 (Figure 1), circuit is closed on the relay C.30 (Figure 2) which closes through the bridge thereon, circuit through an extension of the wire $u$, already traced, to the negative pole of the solenoid C.31' (Figure 2), the positive pole whereof is connected with an extension of the wire $o'$, already traced, which is closed at the lower bridge of the relay C.29', and contact 42 at disk $40^5$ (Figure 5) of the transmitter 40 (Figure 1). The solenoid C.31' (Figure 2) so energized retracts its plunger which terminates at its upper extremity in a latch 24' operative on the teeth of a disk 25' mounted on a shaft 26' in common with an arm 27', corresponding in the present specification to the hundreds order of a quotient. The arms 27'', 27''' corresponding, respectively, to the tens and units orders, are exactly similar in operation and construction to the arm 27'. The arm 27', according to its angular deflection, closes circuit to a series of contacts $29^0$–$29^9$ (Figures 2, 18) placed in circular position relatively to the axis of the arm 27'.

In normal position the quotient arm 27' (Figures 2, 18) closes circuit on the contact $29^0$. Depression of the push button P.3 transmits current to the relay C.30, which retracts its plunger and energizes the solenoid C.31'. The solenoid C.31' retracts its plunger and rotates the arm 27' a single step, into position where it closes circuit at the contact 29', signalizing a first subtraction of the divisor from the dividend, at its hundreds order, and a unit in the hundreds order of the quotient. As the wheel 76 (Figure 1) revolving, closes at the beginning of each subsequent subtraction, circuit through the wire $g$, at successive conductors 86 (Figure 3), the arm 27' (Figure 2) is progressively advanced by the solenoid C.31' to the contacts $29^1$–$29^9$ (Figure 18), until the remainder at the upper order is reduced to less than the divisor and the transmitter 40 (Figure 1) shifts the operation to lower decimal orders, as hereinbefore explained. When circuits are so shifted by the transmitter 40 (Figure 1), circuit to the solenoid C.31' through the wire $o'$ is broken at the contact 42 (Figure 5) and is closed by the contact 42, through the wire $o''$ to the relay C.29'' (Figure 2) and over the lower bridge thereof to the solenoid C.31'', which in manner similar to that of the solenoid C.31', operates upon the arm 27'', causing the arm 27'' to close progressively on the contacts $30^0$–$30^9$, corresponding to numerals of the quotient in the order of the tens. If, when circuits be so shifted, the remainder still be less than the divisor, and accordingly, no current flows through the comparator (Figure 14) to the relay C.10; the circuit of the wire $u$ remains open at the bridge 95 (Figure 1) to the relay C.30 (Figure 2) and thence to the solenoid C.31''. The arm 27'', will remain, therefore, closed on the contact 30⁰. The next shift of circuits by the transmitter 40 (Figure 1) breaks, at the disk 40⁵ circuit through the contact 42 (Figure 5) over the wire $o''$ to the relays C.29'', C.31''', and closes circuit through the wire $o'''$ to the relay C.29''' and solenoid C.31''''. The solenoid C.31'''' develops, in manner similar to that of the solenoids C.31', C.31'' the numeral of the quotient in the units order, by advancing the arm 27''' progressively at the contact 31⁰–31⁹. The wires leading from contacts 29⁰–29⁹ at the quotient arm 27' are shown as carried in the cable $gff'$ (Figure 2). Wires from similar contacts at the respective quotient arms 27'', 27''' are carried in the cable $gff''$, $gff'''$. The said cables $gff'$, $gff''$, $gff'''$ lead to the push button P.7', depression of which, closes circuits of their several wires, and causes the quotient to be recorded by mechanism disclosed in copending application Serial No. 44,159. Should it happen, at the beginning of an operation, that the divisor be greater than the higher orders of the dividend; circuit would be broken at the comparator (Figure 14) to the relay C.10. Circuit to the relay C.30 would remain open, and the initial depression of the push button P.3, would operate no displacement of the arm 27', 27'', 27'''. Shift of circuits would however, be effected, by the transmitter 40 (Figure 1) in manner hereintofore disclosed; and the operation of division be performed at lower orders.

The positive or negative quality of the quotient is revealed, through the action of the relays C.16, C.17, C.17' (Figure 1). The relay C.16 is in a circuit which originates at the source ZZ, and passes through the wire $s-$, contact plate 9 at the master switch 7, and the wire $dn$ to the relay C.16, and thence through the wire $s+$ back to the source ZZ. The wire $dn$ is closed, and the relays C.16, C.17, C.17' are active, only in operations of division. When the divisor is positive, a negative current is closed on the wire $i$, by the master switch 7 (Figure 2), at the contact plate 9. When the divisor is negative, a positive current is closed by the master switch 7, on the wire $i$ at the contact plate 12. The wire $i$ passes over the bridges 209, 210, depressed, to a pole of the relay C.17. The other pole of the relay C.17 is connected with a wire $dn'$, which leads from the bridge 97 fixed to the upper extremity of the relay C.11, over the bridge 211 closed at the relay C.16. When the dividend is positive, the wire $d'$ is inactive, as hereintofore explained; and the plunger of the relay C.11 is released. A negative current is then closed at the bridge 97, through the wire $dn'$ over the bridge 211, to the relay C.17. When the dividend is negative, the wire $d'$ is active and the plunger of the relay C.11 is retracted, closing at the bridge 97, a positive current from the source ZZ, through the wire $s+$ and the wire $dn'$ to the relay C.17. If the dividend and the divisor are of the same quality; the relay C.17 remains inactive. If the dividend and the divisor are of different qualities, a negative current flows to one pole, and a positive current flows to the opposite pole of the relay C.17, which retracts its plunger upwards; and closes at the bridge 207, a positive current from the source ZZ and the wire $s+$ to the wire $d''$ leading to the solenoid C.64 (Figure 19) which is an element in recording mechanism fully disclosed in copending application Serial No. 44,159. The solenoid shifts an inking ribbon 233 of different colors, causing the recording mechanism conveniently to record a positive quotient in black, when the circuit $d''$ is open; and a negative quotient in red, when the circuit $d''$ is closed.

Inasmuch as the dividend may be reduced to zero in the process of division, and eventual current to the relays C.11, C.16, C.17 fail, before the quotient be recorded, the relay C.17' (Figure 1) is provided, which operating with the relay C.17 upon a common plunger, holds this common plunger in stick if retracted at the beginning of an operation by the relay C.17. The relay C.17' is in the circuit of the wire $dn$, already traced, its positive pole being connected through the wire $s+$ when its plunger is retracted, back to the source ZZ.

Conservation of quantities

Referring to Figure 11, two banks of relays A., B. are shown, external to all calculating units, to and from which banks, quantities developed at a calculating unit (Figure 1) may be transferred, through the switch member 193 which is detachable and may be closed at volition on switch members such as either 193$a$ or 193$b$. These banks A., B., may be termed conservators, and may exist in any number (Figure 13).

A bank such as banks A., B. (Figure 11), may comprise relays corresponding to any required number of denominational orders, either integral or fractional.

Quantities may be conserved as sub-totals or for reference; or they may function, as presently described, in computations at the calculating unit, independently of such usual controls as the levers, 1', 1'', 1''', 2', 2'', 2''' (Figure 2); the relays such as shown at the banks A. or B. (Figure 11), closing all circuits normally operated by said levers and serving as substitute controls.

Circuits may be established between a calculating unit (Figure 1) and banks such as the banks A., B. (Figure 11) through switch members 193, 193'. Each bank may be switched into the circuit of numerous calculating units, and may operate simultaneously in similar or dissimilar computations upon all (Figure 13). A quantity reflected at the accumulator arms 61', 61'', 61''' (Figure 1) may be transferred to any selected bank such as the banks A., B. (Figure 11) from any calculating unit such as shown in Figure 1, by closing switch members similar to the members 193, 193$a$ and depressing a push button such as the push button P.7 (Figure 1). Quotients may similarly be transferred to a conservator by depressing the push button P.7' (Figure 2), whose lowest bridge is shown in Figure 1.

Quantities transferred to banks, such as the banks A., B. (Figure 11), may subsequently be made to operate upon a calculating unit (Figure 1), by again closing circuits at the switch members 193, 193', 193$a$, 193$b$ (Figure 11), the circuits closed through the switch member 193, substituting the circuits normally closed at the levers 1', 1'', 1''' (Figure 2), and the circuits closed through the switch member 193' (Figure 11) substituting, when a quantity conserved serves for example, as a multiplier, circuits normally closed at the levers 2', 2'', 2''' (Figure 2). The position of the master switch 7 (Figure 2) determines the operation which shall be performed; and the operation is initiated according to its nature, by depression of a push button P.1, P.2, P.3.

The relays in the highest tier in any bank, such as the banks A., B. (Figure 11) correspond to hundreds; the relays of the middle tier, to tens; and the relays of the lowest tier, to units.

Carried in the cable $ff'$ (Figures 1, 11) are the wires $af^0$–$af^9$ corresponding to the numerals 0 to 9, leading respectively from the contacts $238^0$ to $238^9$ (Figure 20), placed in circular position in the pathway of the accumulator arm $61'$. Carried in the cable $ff''$ (Figures 1, 11) are similar wires leading respectively from corresponding contacts at the accumulator arm $61''$; and carried in the cable $ff'''$, are similar wires leading respectively from corresponding contacts at the accumulator arm $61'''$. The circuits of the cables $ff'$, $ff''$, $ff'''$, normally lead to the recording mechanism disclosed in copending application Serial No. 44,159. Depression of the push button P.7 (Figure 1) breaks at its three highest bridges, said circuits to recording mechanism and closes the wires $af^0$–$af^9$, carried by the cable $ff'$, respectively to the positive poles of the relays $C.37^0$ to $C.37^9$ in bank A. (Figure 11), for example, or similarly to other banks; the said corresponding wires carried by the cable $ff''$, to the respective relays $C.36^0$–$C.36^9$, and the said corresponding wires carried by the cable $ff'''$, to the respective relays $C.35^0$–$C.35^9$. The negative poles of the relays $C.35^0$–$C.35^9$, $C.36^0$–$C.36^9$, $C.37^0$–$C.37^9$ are connected with the wire $s^-$ back to the source ZZ (Figure 1).

At the three bridges of the push button P.7 (Figure 1) immediately below the three bridges traversed by the cables $ff'$, $ff''$, $ff'''$, circuits are closed from the wire $s^+$ leading from the source ZZ, to the wires $m'$, $m''$, $m'''$, shown as carried in the cable $mm$ (Figure 1), to the conductors $276'$, $276''$, $276'''$ (Figure 7), at the accumulator arms $61'$, $61''$, $61'''$.

Circuits may similarly be closed from the contacts $29^0$–$29^9$ at the typical quotient arm $27'$ (Figures 2, 18) and carried in the cable $qff'$; from the similar contacts $30^0$–$30^9$, at the quotient arm $27''$, carried in the cable $qff''$; and from the similar contacts $31^0$–$31^9$ at the quotient arm $27'''$, carried in the cable $qff'''$. Depression of the push button P.7' (Figure 2) breaks, at its three highest bridges, circuits to said recording mechanism; and closes circuit through the wires carried by the several cables $qff'$, $qff''$, $qff'''$ (Figure 2), to the switch members 193, 193a, for example, where circuit may be closed through the extension wires carried by the cables $ff'$, $ff''$, $ff'''$ (Figures 2, 11), to the relays at the bank A. (Figure 11). Circuits are thus closed respectively from the contacts $29^0$–$29^9$ (Figures 2, 18) at the quotient arm $27'$, to the relays $C.37^0$–$C.37^9$ (Figure 11) from the contacts $30^0$–$30^9$ (Figure 2) at the quotient arm $27''$, to the relays $C.36^0$–$C.36^9$ (Figure 11); and from the contacts $31^0$–$31^9$ (Figure 2) at the quotient arm $27'''$, to the relays $C.35^0$–$C.35^9$ (Figure 11). Depression of the push button P.7' (Figure 2) closes at the three bridges next below the bridges traversed by the cables $qff'$, $qff''$, $qff'''$, circuit from the wire $s^+$ through the wires $mn'$, $mn''$, $mn'''$, shown as carried in the cable $mn$, to the respective quotient arms $27'$, $27''$, $27'''$, which, according to their angular deflections complete circuits to corresponding relays at the bank A. (Figure 11).

If now, for example, the quantity 845 be reflected at the accumulator arms $61'$, $61''$, $61'''$ (Figure 1); the accumulator arm $61'$, when the push button P.7 (Figure 1) is depressed, completes circuit to the relay $C.37^8$ (Figure 11). The accumulator arm $61''$ (Figure 1) completes circuit to the relay $C.36^4$ (Figure 11); and the accumulator arm $61'''$ (Figure 1) completes circuit to the relay $C.35^5$ (Figure 11). The relays $C.37^8$, $C.36^4$, $C.35^5$, so energized, retract their plungers, and are held in stick by a circuit which originates at the source ZZ (Figure 1), and passes through the wires $s^+$, $uf$, over the bridge at the relay $C.39a$ (Figure 11), the highest bridges to the relays $C.37^8$, $C.36^4$, $C.35^5$, and thence through the wire $s^-$ back to the source ZZ (Figure 1).

Negative quantities, which read at the accumulator arms from zero to the left, are transferred to the conservators through $ff$ wires of complementary index number; shift of circuits being effected by the relay C.47 (Figure 20), in manner of the relay C.24 (Figure 17) hereinbefore described.

The positive or negative quality of a quantity transferred from the accumulator arms $61'$, $61''$, $61'''$ (Figure 1) is established in the bank A. (Figure 11), for example, at the relay $C.38a$, the negative pole of which is connected through the wire $s^-$ with the source ZZ. The wire $d'$, closed at the conductor 90 (Figures 1, 7, 8) as hereinbefore described, when the quantity reflected at the accumulator arms $61'$, $61''$, $61'''$ is negative, closes over the lowest bridge depressed at the push button P.7 (Figure 1), and over the next to lowest bridge at the relay $C.16'$, the wire $dz$ leading to the positive pole of the relay $C.38a$. If, when the push button P.7 is depressed the wire $d'$ is closed at the conductor 90 (Figures 7, 8), circuit is completed through the wires $d'$, $dz$ to the relay $C.38a$, which, held thereupon in stick by current from the wire $uf$, closes a positive current from the wire $uf$ at the bridge 213 raised, to the wire $i'$. If the quantity transferred be positive; circuit through the wire $d'$ to the relay $C.38a$ is open at the conductor 90, and a negative current is closed from the wire $s^-$ at the bridge 212 to the wire $i'$. The wire $i'$ is accordingly negative, when the quantity conserved be positive; and positive, when the quantity conserved be negative, to effect presently described.

In corresponding manner, the positive or negative quality of a quotient, (Figure 11) may be reflected at the relay $C.38a$. When, as hereinbefore described, the quotient be negative, circuit is closed at the bridge 207 (Figure 1) from the wire $s^+$ to the wire $d''$. Depression of the push button P.7' (Figure 2) closes circuit of the wire $d''$, over the lowest bridge raised, at the relay $C.16'$, to the wire $dz$ which leads, as above described, to the positive pole of the relay $C.38a$ (Figure 11). If, accordingly, the quotient transferred be a negative quantity, circuit is completed at the bridge 207 to the relay $C.38a$, which closes at the bridge 213 positive current to the wire $i'$. If the quotient transferred be positive, circuit to the coil $C.38a$ is open at the bridge 207; and a negative current is closed to the wire $i'$, at the bridge 212.

A quantity having been transferred to the bank A., and its quality there established at the relay $C.38a$, (Figures 1, 11), connection between the calculating unit and the bank A. may be broken at the switch members 193, 193a (Figure 11) and the quantity conserved at the bank A., remains indefinitely available for future operations.

If it be desired to restore the relays of the bank A. to zero position, the switch member 193 being closed on the switch member 193a, the push button P.8 (Figure 1) is depressed, closing at its bridge circuit from the wire $s^+$ to the relay $C.39a$ (Figure 11), whose negative pole is connected through the wire $s^-$ with the source ZZ. The relay C.39a so energized retracts its plunger, and breaks the circuit of the wire $s^+$ to all other relays at the bank A., whose plungers are thereupon released.

The bank B. (Figure 11) is in all respects similar in operation, quantities being transferred thereto, through the switch member 193 if closed on the switch member 193b.

Should it be desired to transfer the quantity 845 conserved for example, at the bank A., (Figure 11) back to the calculating unit (Figure 1); the switch member 193 (Figure 11) is restored to connection with the switch member 193a; and the push button P.1 (Figure 2) is depressed, initiating at the calculating unit (Figure 1) an operation in the nature of addition or subtraction according to the negative or positive activity of the wire $i'$ which defines the positive or negative quality of the quantity conserved.

Closed at the switch member 193, 193a (Figure 11) are extensions of the wires $b^1$–$b^9$, shown as carried in the cable $bb$, from the bank A to the timing arm 78 (Figure 1). Closed, if the quantity be 845, by the relay C.$37^8$ (Figures 11, 12) at the bridge $201^8$ is the wire $e'$, leading to the relay C.2' (Figure 1). Closed at bridge $202^8$ (Figures 11, 12) is circuit from the extension of the wire $b^8$ and an extension of the wire $c'$, to the relay C.4' (Figure 1). The $c$ and $e$ wires pass through the transmitter 40, as when closed at the levers 1', 1", 1''' (Figure 2), in manner previously described. Closed at corresponding bridges by the relay C.$36^4$ (Figure 11) are circuits through extensions of the wire $e''$ to the relay C.2'' (Figure 1), and from the extension of the wire $b^4$ over an extension of the wire $c''$, to the relay C.4'' (Figure 1). Closed at corresponding bridges by the relay C.$35^5$ (Figure 11) are circuits through an extension of the wire $e'''$ to the relay C.2''' (Figure 1), and circuit from the extension of the wire $b^5$ over an extension of the wire $c'''$ to the relay C.4'''.

In operations of simple transfer to a calculating unit, of a quantity conserved, as in the example 845, the master switch 7 (Figure 2) is not displaced; since whether the operation be in the nature of addition or subtraction, depends upon the quality of the quantity conserved, which may be unknown. It is necessary only to close circuits between the switch members 193, 193a (Figure 11) and depress the push button P.1 (Figure 2). For when in normal position, the master switch 7 closes at the contact plate 10' (Figure 2) an extension $s'^+$ of the wire $s^+$ to the wire $a$ which leads to the timing arm 78 (Figure 1). This extension $s'^+$ connects with the wire $s^+$ immediately above the switch member 193a (Figure 11) and is active when the master switch 7 is undisturbed. The quantity in operation being 845, the bridge $201^8$ (Figure 11) shown as raised in Figure 12, closes circuit through an extension of the wire $e'$ to the relay C.2' (Figure 1). Corresponding bridges and the relays C.$36^4$ and C.$35^5$ (Figure 11) close circuit through extension of the wires $e''$, $e'''$, respectively to the relays C.2'', C.2''' (Figure 1). As the timing arm 78 (Figure 1) revolves, circuit is closed on extensions of the wires $b^8$, $b^4$, $b^5$, carried in cable $bb$, to the bridges $202^8$ of relay C.$37^8$, (Figures 11, 12) and corresponding bridges at the relays C.$36^4$, C.$35^5$ (Figure 11) to the wires $c'$, $c''$, $c'''$ (Figure 1) and thereby to the relays C.4', C.4'', C.4'''. When (the push button P.1 having been depressed), the timing arm 78 (Figure 1) completes circuit to the relays C.4', C.4'', C.4''', thereby breaking circuit to the relays C.2', C.2'', C.2'''; the accumulator arms 61', 61'', 61''' are arrested at displacements corresponding to the numerals of the quantity 845 conserved at the bank A (Figure 11), in similar manner as were the quantity set up at the levers 1', 1'', 1''' (Figure 2). The quality of the quantity conserved, in determining whether the operation shall be in the nature of addition or subtraction, may now be considered.

When the switch members 193, 193a, are closed, a circuit is thereby completed to the relay C.12 (Figure 1) which originates at the source ZZ and passes through the wires $s^-$, $s'^-$ (Figures 1, 11) back through the switch members 193a, 193, and connects over the bridge 103a with the wire $dr$ (Figure 1), which, passing over the bridge 103, extends to the negative pole of the relay C.12, the positive pole whereof is as previously described, connected through the wire $s^+$ back to the source ZZ. The relay C.12 retracts its plunger, breaking at the bridge 101, the circuit of the wire $d'$, to the relay C.11; and closing on the relay C.11, at the bridge 102, a circuit which leads from the bridges of the relay C.38a (Figure 11) through the wire $i'$, over the bridges 103a' 103' (Figure 1). If the quantity conserved be positive, a negative current is closed by the bridge 212 at the relay C.38a (Figure 11) to the relay C.11 (Figure 1) through the wire $i'$, and the relay C.11 remains inactive; since its opposite pole is likewise negative, being connected with the wire $s^-$. When so inactive, the relay C.11 closes circuit at the bridge 98 from the wire $dr$ to the clutch C.5; and an operation in the nature of addition follows, the accumulator arms 61', 61'', 61''' being displaced in clockwise direction. If the quantity conserved at bank A (Figure 11) be negative; a positive current is closed by the relay C.38a at bridge 213 (Figure 11) through the wire $i'$ to the relay C.11; and the relay C.11 so energized switches at the bridge 99, the circuit of the wire $dr$ to the clutch C.5a. An operation in the nature of subtraction follows, the accumulator arms 61', 61'', 61''' (Figure 1) being displaced in direction opposite to clockwise. Quantities so transferred back to a calculating unit are automatically added or subtracted from a quantity already reflected at the accumulator arms 61', 61'', 61'''.

In multiplication, the quantity conserved at a bank, such as the bank A. or B. (Figure 11) may constitute the multiplicand, and the multiplier may be established at the levers 2', 2'', 2''' (Figure 2). The switch member 193, for example, may be closed on the switch member 193a (Figure 11), the switch member 193' being disconnected from the switch member 193b, and the levers 1', 1'', 1''' (Figure 2) remaining inactive. The master switch 7 is placed in position $x^{(+)}$ or $x^{(-)}$ according to the quality of the multiplier, the quality of the multiplicand being conceivably unknown. In position $x^{(+)}$ the master switch 7 closes a negative current on the wire $i$; in position $x^{(-)}$ it closes, on the wire $i$, a positive current. All other circuits are closed at the master switch 7, which are closed, as hereinbefore described, when the multiplicand be established at the levers 1', 1'', 1'''.

Energized through the wire $s'^-$ closed only when connection is established with a bank such as the bank A., is the relay C.14 (Figure 1), whose positive pole is connected with the wire $s^+$. So energized, the relay C.14 raises the bridges 209, 210, and closes circuits presently described.

The wire $i$ which may be either positive or negative, according to the position of the master switch 7, is closed to a pole of the relay C.15 (Figure 1). The opposite pole of the relay C.15 is connected with the wire i' leading from the bridges of the relay C.38a (Figure 11) as above described.

If the quality of both the multiplier and the multiplicand be positive; negative currents are closed on both poles of the relay C.15 (Figure 1). If the quality of both multiplier and multiplicand be negative; positive currents are closed on both poles of the relay C.15. In both cases, the relay C.15 remains inactive; and circuit remains open at the bridge upon its plunger, to the relay C.11. The plunger of the relay C.11 being accordingly in released position, circuit is closed at the bridge 99 through the wire dr to the clutch C.5. Motion in clockwise direction follows, and a positive product accordingly results. Should the multiplier and the multiplicand be of different qualities, a negative and a positive current are closed on the poles of the relay C.15, which, thereupon, retracts its plunger, completing circuit over the bridge thereat and the bridges 209, 101, raised, to the relay C.11, which so energized switches at the bridge 99 current of the wire dr to the clutch C.5a, and reverses the direction of motion at the accumulator arms 61', 61'', 61'''; a negative product being developed. Relay C.13a, in circuit of the wire dr, s'+, breaks, in multiplication the circuit of the wire i' over the bridge 103', 103a' to prevent possible interference with circuit of wire s'+ over bridges 209, 101 to the relay C.11; if the wire i' be negative, and the wire i positive. The relay C.13 performs, at bridge 103, a similar function, in division.

With circuits closed as above, the relays at the bank A. (Figure 11) simply substitute the levers 1', 1'', 1''' (Figure 2), at which the multiplicand is normally established; and otherwise, the operation of multiplication is performed as hereinbefore described.

A quantity conserved at the bank A. (Figure 11) may be multiplied by a quantity conserved at the bank B. or vice versa. The quantity conserved at the bank A may, for example, be selected as the multiplicand, and the quantity conserved at the bank B, may be selected as the multiplier. The switch members 193, 193a close circuits to and from the bank A, as hereinbefore described. The switch member 193' is closed on the switch member 193b.

The two switch members 193, 193' (Figure 11) are dissimilar in the sense that they are not wired to the same elements of the calculating unit (Figure 1). The conserved quantity selected as a multiplier operates always through the switch member 193', through which the wires $a^0$–$a^9$ are carried in an extension of the cable aa, from the third lowest bridges at relays of bank B, for example, corresponding to the bridges $202^7$, $202^8$, $202^9$ shown in Figure 12; and lead to the $a^1$–$a^9$ terminals, at the timing arm 78 (Figure 1). It thus appears that similar wires of the banks A., B. become dissimilar extensions in circuits of the calculating unit, accordingly as they be connected therewith, the same wires of a bank serving for example, as extensions of circuits either a or b.

The wires $a^0$–$a^9$ respectively lead each from the relays of corresponding index number in all orders, the wire $a^5$ for example, leading in common from the bridges at the relays $C.37b^5$, $C.36b^5$, $C.35b^5$; (Figure 11) and the wire $a^8$ leading in common from the bridges at the relays $C.37b^8$, $C.36b^8$, $C.35b^8$. Current may be closed to the wires $a^0$–$a^9$ by the relays $C.37b^0$–$C.37b^9$, from the wire o'; by the relays $C.36b^0$–$36b^9$, from the wire o''; and by the relays $C.35b^0$–$35b^9$, from the wire o''', the wires o', o'', o''' being shown in Figures 1 and 11, as carried in the cable oo from the disk $40^5$ (Figure 1), where they are progressively closed in successive partial operations, to the wire o, as hereinbefore described.

Were a multiplicand 80, at the bank A., to be multiplied by the multiplier 5, at the bank B., the switch member 193 would be closed on the switch member 193a, and the switch member 193' on the switch member 193b, as shown in Figure 11. The master switch 7 (Figure 2) is placed in position x, closing similar circuits as when placed as positions x(+), x(−), save that it closes no current through the wire i; since the qualities of both multiplicand and multiplier are conceivably unknown. At the bank A (Figure 11) the relay $C.36^8$ corresponding to 8 in the tens column of the multiplicand, and the relay $C.35^0$ corresponding to zero in the units column would be in stick, the relay $C.36^8$ closing circuit through the wire e'' to the relay C.2'' (Figure 1) as above described; the wire closed at the lowest bridge by the relays $C.35^0$, $C.36^0$, $C.37^0$, being in open circuit at the switch member 193a, since this wire is operative only when the quantity conserved at bank A., serves as a multiplier.

At the bank B., the relay $C.35b^5$, corresponding to the numeral 5 in the units column of the multiplier is in stick, closing circuit from the wire o''' through the wire $a^5$ to the timing arm 78 (Figure 1), the wire o''' being closed on the wire o, at the disk $40^5$ (Figure 5), by the column shift mechanism fully disclosed in co-pending application 44,159.

The push button P.2 (Figure 2) is depressed, transmitting initial impulse to the relay C.2'' (Figure 1), and the calculating unit enters into action. The circuit described as closed by the relay $C.35b^5$ (Figure 11) originates at the source ZZ (Figure 1) and passes through the wire s+ (Figures 1, 2), the contact plate 12 at the master switch 7 (Figure 2), the wire o (Figures 2, 1) conductor 41 (Figures 1, 5), contact 42, extension of the wire o''' carried in the cable oo (Figures 1, 11) through the switch members 193', 193a to the third lowest bridge at the relay $C.35b^5$, the wire $a^5$ carried by the extension of the cable aa through the switch members 193b, 193' to the timing arm 78 (Figure 1), which revolving closes circuit of the wire $a^5$ through the conductor $78^5$ to the wire $b^8$ carried in the extension of the cable bb through the switch members 193, 193a (Figure 11), to the third lowest bridge at the coil $C.36^8$, where the wire $b^8$ is closed on the extension of the wire c'', which leads through the switch members 193a, 193 and the transmitter 40 (Figure 1), to the positive pole of the relay C.4'', and thence through the wire s− back to the source ZZ. The relay C.4'' so energized breaks circuit at the bridge 70'' to the relay C.2'', arresting thereby the accumulator arm 61'' (Figure 2) at a displacement of four revolutions, as hereinbefore described. The carry-over is transmitted to the accumulator arm 61' which is displaced four steps and the accumulator arms 61'', 61''' being at zero, the product 80×5=400 is thereby reflected, and transmitted to the recording mechanism described in copending application Serial No. 44,159. Shift to lower orders, after each partial operation is effected by the clutch C.26 (Figure 1) energized by circuit through conductors at the wheel 76, as in operations wherein the multiplier be established at the levers 2', 2'', 2''' (Figure 2).

Zeros in the multiplier are reflected at the relays C.37$b^0$, C.36$b^0$, C.35$b^0$ (Figure 11). In order to suspend multiplication when reaching such a zero, circuit is closed at its lowest bridge by the relay C.37$b^0$, C.36$b^0$, or C.35$b^0$ as the case may be, to the extension of the wire $a^0$, leading to the relay C.1 (Figure 1), by which the circuit of the wire $h$ to the clutch C.5 or C.5$a$ is broken at the relay C.1, as already described, when a zero in the multiplier be reached. The relay C.1 is held in stick by the wire $w$. In order that the levers 2', 2'', 2''' (Figure 3) may not operate upon the relay C.1 (Figure 1), when the multiplier is a quantity conserved; the relay C.3 (Figure 1) is provided, which breaks at the bridge carried by its plunger, the circuit of the wire $a^0$ leading from the levers 2', 2'', 2''' (Figure 2) to the relay C.1 (Figure 1). The positive pole of the relay C.3 is connected with the wire $s'+$, its negative pole being connected with the source ZZ, through an extension of the wire $s-$ closed at the switch members 193$a$, 193' (Figure 11). The wire $a^0$ when closed at a relay C.37$b^0$, C.36$b^0$, C.35$b^0$, operates upon the relay C.1, and suspends multiplication, as when closed at the levers 2', 2'', 2''' (Figure 2).

Direction of motion and the positive or negative definition of the product, are controlled by the relays C.38$a$, C.38$b$ (Figures 1, 11). The relay C.14 (Figure 25) as already explained is energized so long as circuit be closed to the switch member 193. The wire $i'$ leads from the bridges at the relay C.38$a$ in bank A., to a pole of the relay C.15. The wire $ib$ leads to the opposite pole of the coil C.15, from the bridges at the relay C.38$b$ in bank B. If the multiplier and the multiplicand be of the same quality, the relay C.15 remains inactive; and circuit remains open at its bridge to the relay C.11 (Figure 1). The plunger of the relay C.11 is in released position, and circuit of the wire $dr$ is closed at the bridge 98 to the clutch C.5, which causes the accumulator arms 61', 61'', 61''', to rotate in clockwise direction, a positive product being thereby developed. If the multiplier and the multiplicand conserved at the banks A, B. be not of the same quality; a positive and a negative current flow from the bridges at the relays C.38$a$, C.38$b$ (Figure 11) to the poles of the relay C.15 (Figure 1), which being energized thereby, closes at the bridge thereon, circuit originating at the source ZZ and passing through the wire $s+$ the extension $s'+$ of the wire $s+$ closed at the switch members 193$a$, 193, the bridge at the relay C.15, and bridges 209, 101, to the positive pole of the relay C.11, which so energized breaks at bridge 98 the circuit of the wire $dr$ to the clutch C.5, and closes the circuit of the wire $dr$ at the bridge 99 to the clutch C.5$a$, causing, thereby motion at the accumulator arms 61', 61'', 61''', in direction opposite to clockwise; and a negative product is developed.

Quantities conserved at banks such as banks A, B. (Figure 11) may enter operations of division. Assume, for example, that a quantity set up at the accumulator arms 61', 61'', 61''' serve as a dividend and a quantity conserved at the bank A., (Figure 11) serve as a divisor. The switch member 193 is closed on the switch member 193$a$. The master switch 7 (Figure 3) is placed in position (÷), at which it closes the circuits entering into operations of division as hereintofore described, save only that it closes no current to the wire $i$, and leaves open at the contact plate 10 the circuit of the wires $v-dp$ from the comparator sectors 122', 122'', 122''' (Figures 2, 14). The push button P.3 is depressed. The master switch 7 (Figure 2) closes further at the contact plate 9 a circuit from the wire $s-$ to the wire $dn$ (Figures 2, 1) leading to the negative poles of the relays C.27', C.27'', C.13, C.16, C.17' (Figure 1). The relays C.27', C.27'' whose positive poles are connected through the extension $s'+$ of the wire $s+$, closed at the switch 193, break the circuits of the wires $t'$, $t''$, from their terminals at the comparator sectors 122', 122'', (Figures 1, 2, 14), preventing conflict thereby, with comparator circuits substituted therefor, as presently described, leading from the relays of the bank A (Figure 11). The relay C.13 (Figure 1) whose positive pole is connected with the extension of the wire $s'+$ breaks at the bridge 103 the circuit of the wire $s'-$ disabling, thereby, the relay C.12. The relays C.16, C.17 together with the relay C.17', are operative as presently described, in defining the quality of the quotient. Circuits through the $c$, $e$ wires to the C.4, C.2 relays (Figure 1) are closed at the relays of bank A. (Figure 11), as in addition, subtraction and multiplication.

After passing over the bridges at the relay C.24 (Figure 1) which switches comparator circuits to the conservator relays according to positive or negative quality, the same effect hereinbefore described, as to the comparator sectors 122', 122'', 122''' (Figures 2, 17), and through the disks of the transmitter 40 (Figures 1, 14), the $p$, $q$, $r$ wires of the comparator, leading respectively from the left hand contact at the accumulator arms 61', 61'', 61''' (Figure 1) and carried in the cables $pp$, $qq$, $rr$, are extended through the switch members 193, 193$a$ (Figure 11), to bridges at relays of the bank A. The circuits of the wires $p^0-p^9$ are respectively closed by the relays C.37$^0$–C.37$^9$, at the bridges 204$^0$–204$^9$ (Figures 11, 17) when their plungers are relaxed; being broken at a bridge 204$^0$–204$^9$ and closed at a bridge 205$^0$–205$^9$, when a plunger is retracted. The wires $q^0-q^9$ lead similarly from the accumulator arm 61'' (Figure 1) to corresponding bridges at the relays C.36$^0$–C.36$^9$ (Figure 11); and the wires $r^0-r^9$ lead similarly from the accumulator arm 61''' (Figure 1) to corresponding bridges at the relays C.35$^0$–C.35$^9$ (Figure 11). For example, the circuit of the wire $p^8$ is extended to bridges at the relay C.37$^8$ (Figures 11, 12); where the bridges 203$^0$–203$^9$ (Figure 11) substitute the conductor 124' at the sector 122' (Figures 14, 17) and the bridges 205$^0$–205$^9$ (Figure 11) substitute the isolated contact 123'. At the bridges 205$^0$–205$^9$ (Figure 11) circuit is closed over an extension of the wire $t'$ (Figures 11, 1) to the accumulator arm 61'', which, in turn, closes circuit on a wire $q^0-q^9$ (Figure 14) leading similarly to corresponding bridges at the relays C.36$^0$–C.36$^9$; where circuit may be closed on an extension of the wire $t''$ through the transmitter 40, to the accumulator arm 61''', by which circuit may be similarly closed through a wire $r^0-r^9$ (Figure 14) to corresponding bridges at a relay C.35$^0$–C.35$^9$ (Figure 11), and thence through an extension of the wire $t'''$ and the wire $dp$, to the relays C.10, and the clutch C.5 or C.5$a$. The bridges at the relays C.37$^0$–C.37$^9$ (Figure 11) corresponding to the bridges 205$^7$, 205$^8$, 209$^9$, (Figure 12) are all in the circuit of the wire $t'$. The wires $t''$, $t'''$ closed respectively at relays C.36$^0$–C.36$^9$, C.35$^0$–C.35$^9$ pass each over corresponding bridges. The operation of the bridges 204$^0$–204$^9$ at the relays C.37$^0$–C.37$^9$ and of corresponding bridges at the relays C.36⁰–C.36⁹, C.35⁰–C.35⁹, now may be described.

Let it be assumed that the numeral in the highest order of the divisor established at the bank A, be 8, and that the relay C.37⁸ be in stick, as shown in Figure 12. If the numeral of the corresponding order in the dividend or in a remainder, be greater than 8, for example 9; circuit is closed by the accumulator arm 61' at the contact 120⁹ (Figures 14, 17) on the wire $p^9$ leading through its extension to the bridge 205⁹ open, and the bridge 204⁹ closed, at the relay C.37⁹ (Figures 11, 12). In such event current flows over the bridge 204⁹, through the extension of the wire $dp$ to the relays C.10, and clutch C.5 or C.5a (Figure 1); and a subtraction follows, a single excess unit in a higher order being greater than any possible quantity in the divisor at orders therebelow.

If the first numeral of the dividend or of a remainder, be the same as the first numeral of the divisor, to wit: 8, circuit being closed by the accumulator arm 61' through the wire $p^8$ to the bridges 204⁸ open, and to the bridge 205⁸ closed, at the relay C.37⁸ (Figures 11, 12); current then flows through the wire $t'$ to the accumulator arm 61'' (Figures 1, 14).

If the first numeral of the dividend or of a remainder, be smaller than the first numeral of the divisor, for example, 7, the circuit is closed by the accumulator arm 61' at the contact 120⁷ (Figures 14, 17) to the wire $p^7$ leading to the bridge 204⁷ closed, (Figures 11, 12), and the bridge 205⁷ open, at the relay C.37⁷. The circuit of the wire $p^7$ is accordingly interrupted at the bridge 205⁷ to the wire $t'$, and at the bridge 203⁸ to the wire $dp$; in which event no current flows to the relay C.10 and the clutch C.5 or C.5a (Figure 1); and shift of circuits to lower orders of dividend or remainder follows, as hereinbefore described.

The operation is similar at the relays C.36⁰–C.36⁹, C.35⁰–C.35⁹ (Figure 11). If the numerals of the dividend or remainder, and the divisor, be equal, at the hundreds order, for example 8, (circuit being thereby closed from the wire $p^8$ at the bridge 205⁸, through the wire $t'$ to the accumulator arm 61''), and the second numeral of the dividend or remainder be greater than the second numeral of the divisor; current is similarly closed by corresponding bridges at the relays C.36⁰–C.36⁹, over the wire $dp$ to the relay C.10 and the clutch C.5 or C.5a, and is broken to the wire $t''$. If the numerals in the first order of the dividend or remainder and the divisor be equal, and the numerals in the second order, likewise; current flowing over a bridge at the relays C.36⁰–C.36⁹ corresponding to bridges 205⁰–205⁹ (Figure 12) through the wire $t''$ to the accumulator arm 61''', is similarly closed on the wire $dp$ to the relay C.10 and the clutch C.5 or C.5a, provided the third numeral of the dividend be equal, or greater than a third numeral of the divisor. If the divisor be greater than the dividend, or a remainder is reduced to less than the divisor; current fails the relay C.10 (Figure 1); and at the bridge 96 circuit is closed to the clutch C.26, which displacing the transmitter 40 operates a shift of circuits to lower orders of the dividend or remainder, as hereinbefore described.

If the dividend set up at the accumulator arms be a positive quantity; the wire $d'$ leading from the conductor 90 (Figures 1, 7, 8) over the bridge 101 to the positive pole of the relay C.11, is inactive; and current from the wire $dp$ is closed at the bridge 99 to the clutch C.5a, provoking motion at the accumulator arms 61', 61'', 61''' (Figure 1) in direction opposite to clockwise, as hereinbefore described. If the dividend be negative, the relay C.11, energized by current through the wire $d'$, closed at the conductor 90, switches at the bridge 98, current to the clutch C.5; and the motion of the accumulator arms is reversed.

To one pole of the relay C.17 (Figure 1) passes from the bridges at the relay C.38a (Figures 11, 1) over the bridge 210 raised, the circuit of the wire $i'$ which, as hereinbefore explained, is negative in operations wherein the divisor conserved at the bank A., is positive; and positive in operations wherein the divisor conserved be negative. The other pole of the relay C.17 is connected with the wire $dn'$, which leads from the bridge 97 at the relay C.11 over the bridge 211 closed by the relay C.16, which is energized through the wires $s^+$, $dn$. When the dividend is positive, the wire $d'$ is inactive, as hereinbefore explained, and the plunger of the relay C.11, is released. A negative current is then closed at the bridge 97 through the wire $dn'$ over the bridge 211, to the relay C.17. When, the dividend being negative, the wire $d'$ is active, the plunger of the relay C.11 is retracted, closing at the bridge 97 a positive current to the relay C.17. If the dividend and the divisor are of the same quality, the relay C.17 remains inactive. If the dividend and the divisor are of different quality, a negative current flows to the opposite pole of the relay C.17, which then, as hereinbefore described, closes at the bridge 207 a positive current over the wire $d''$ to the solenoid C.64 (Figure 19) which thereupon exposes the red margin of the typing ribbon 233, by which the quotient is distinguished as negative. The plunger of the relay C.17 is held in retracted position by the relay C.17', as already described, until the quantity and quality of the quotient be recorded by the mechanism disclosed in copending application Serial No. 44,159.

The banks such as the banks A., B., may be in the circuit of any number of calculating units and operate simultaneously thereon (Figure 13), in similar or dissimilar computations.

A quantity may, at volition, be added to or subtracted from a quantity conserved at the bank A. (Figure 11), for example, by setting up the quantity to be added or subtracted, at a calculating unit (Figure 1), closing such switch members as 193, 193a (Figure 11) and depressing, in succession, the push buttons P.1 (Figure 2), P.8 (Figure 1), and P.7. The push button P.1 provokes addition or subtraction, as hereinbefore described. The push button P.8 causes the effacement at bank A of the quantity originally conserved; and the push button P.7 causes transfer to the bank A. of the new resultant. In multiplication and division, resultants may similarly replace a quantity conserved at a bank, such as the bank A. (Figure 11), by effacing, as above described, the quantity originally conserved and transferring, as hereinbefore described, the product or the quotient to the bank, such as the bank A. by means respectively of the push button P.7 (Figure 1) or P.7' (Figure 2).

At the lowest bridges of relays C.35¹–C.35⁹, C.36¹–C.36⁹, C.37¹–C.37⁹ of bank A. (Figures 11, 12) and at similar bridges at bank B., contacts are shown which, through wires of an $ax$ series, control column shift mechanism disclosed in copending application Serial No. 44,159, and in Figures 26, 27 thereto attached, which consigns resultants to proper columns; and, if there be fractional orders, allocates the decimal point.

Restoration of the calculating unit to zero position

Depression of the push button P.5 (Figure 2) closes a circuit which originates at the source ZZ (Figure 1) and passes through the wire s+ (Figures 1, 2), the bridge at the push button P.5 (Figures 2, 7), the wire n to the relay C.19 (Figures 1, 7), best shown in Figure 7, and over the upper bridge on the plunger thereof, to the relay C.20, circuit being closed from the negative poles of the relays both C.19, C.20 through the wire s−, back to the source ZZ. The relay C.19 so energized, retracts its plunger; and, when completing circuit at its upper bridge to the relay C.20; closes at its lower bridge circuit to the negative pole of the relay C.12', and to terminals at the plunger of the relay C.12'. The relay C.20 breaks, at the bridge 167, circuits through the wire h (Figure 1) to prevent interference of circuit with the wire n; and closes at the bridge 168 (Figure 7) circuit to the positive pole of the clutch C.6, fixed to the shaft 58. At the bridge 167, circuit is closed to terminals at the plunger of the relay C.12', through the wire n'.

The relay C.12' determines direction of motion at the shafts 58, 58a, during restoration of the calculating unit to zero position. The positive pole of the relay C.12' is connected with the wire d'. If, when restoration to zero position be initiated, a positive quantity be accumulated at the arms 61', 61'', 61'''; circuit of the wire d' is open at the conductor 90 (Figure 8); the relay C.12' (Figure 7) closes at the bridges 105, 106, depressed, circuit through the wires n−, n', to the negative and positive poles of the clutch C.5a; and motion of the shaft 58 is contra-clockwise. If a quantity accumulated at the arms 61', 61'', 61''', 58 be negative; the wire d' is active as hereinbefore described, and energizes over the bridges 92⁴, 104, the relay C.12', which is then held in stick over the bridge 104 by current through the wire n'. The relay C.12' so energized, closes at the bridges 105, 106 raised, circuit to the clutch C.5; and clockwise motion follows at the shaft 58.

Responsive to the clutch C.6, and floating on the shaft 58, is the armature 69 (Figures 1, 7, 16) which carries a conductor 172, extending, except at a slight arc, throughout the circumference of the disk. Momentary depression of the push button P.5 (Figures 2, 7) imparts initial impulse to the clutch C.5 or C.5a, and C.6. The clutch C.5 or C.5a revolving, transmits motion to the shafts 58, 58a and the clutch C.6, clutching and revolving the disk 69, causes the conductor 172 (Figure 16) to close a circuit from the wire s+ extended from the source ZZ, which holds the relays C.19, C.20 in stick, and sustains current to the clutches C.5 or C.5a, and C.6, after the initial impulse imparted through the push button P.5. The conductor 172 is of such arc as to sustain current throughout a single revolution of the shaft 58, this being sufficient to restore to zero position, the members of the calculating unit.

The clutches C.7', C.7'', C.7''', C.7a', C.7a'', C.7a''' (Figures 1, 7) are active, in restoring to zero position the accumulator arms 61', 61'', 61''', and such other members at the shafts 58, 58a, as may be displaced. The clutches C.7', C.7'', C.7''' are energized to restore members on shaft 58, by circuits of the wire n which pass respectively, over the bridges 171, 170, 169 at the relay C.20 (Figure 1) and conductors 173' (Figure 15) and similar conductors 173'', 173''', to the clutches C.7', C.7'', C.7''', circuits being completed from the negative poles thereof, through wires s− back to the source ZZ. The conductor 173' (Figure 1) is carried by the middle member of the planetary gearing Df'. The conductor 173'' is carried by the middle member of the planetary gearing Df''; and the conductor 173''' is carried by the member 62'''. The operation at all orders is substantially alike. Referring to Figures 1, 15, the conductor 173''', for example, extends throughout the circumference of the member 62''' except at a slight arc, at which, if the member 62''' and the accumulator arm 61''' be already at zero position, circuit is open to the clutch C.7''' (Figure 1). If the accumulator arm 61''' and the member 63''' be displaced; circuit is completed through the conductor 173''' to the clutch C.7''', which clutching, in manner hereinbefore described, the member 62''', transmits motion to the member 62''', until circuit to the clutch C.7''' is broken at the conductor 173''', as the accumulator arm 61''' and the member 62''' reach zero. The accumulator arms 61'', 61' are restored to zero position, by circuits similarly closed and broken, leading to the clutches C.7'', C.7' (Figure 1). The members carried by the shaft 58a may be restored to zero position in similar manner, by extensions of the wire n leading respectively from the bridge 169a at the relay C.20 shown in entirety in Figure 7, to the clutch C.7a'''; from the bridge 170a to the clutch C.7a''; and from the bridge 171a to the clutch C.7a'. Conductors similar to the conductor 173''' (Figure 16), are carried by the disk 62a''', and by the middle members of the planetary gearings Dfa'', Dfa', which break circuit respectively to clutches C.7a''', C.7a'', C.7a', as the sleeves 60a''', 60a'', 60a' reach zero position.

During restoration to zero, circuit to the clutches C.8'', C.8''', C.8a'', C.8a''', through the wire ds− is broken at the lower bridge at the relay C.19, and the carry-over mechanism is inactive, except as to the clutch C.8a', whose negative pole is connected with the wire s−; and which restores to normal position the armature 63a'.

The quotient arms 27', 27'', 27''' (Figure 2) may be restored to zero position, each through the action of a spring released by a trigger when, as disclosed in copending application Serial No. 44,159 (Figure 21), the push button P.5 is depressed.

Having now fully described my invention and its manner of operation, I claim:

1. In combination with a calculating unit comprising means for accumulating a quantity whether positive or negative in quality, including an accumulator, a motor, reversible transmission from the motor for advancing the accumulator in respectively opposite directions to accumulate a positive or negative quantity, and a directional relay to control the reversible transmission; a conservator unit external to the calculating unit, for the storage prolonged according to volition of quantities for future computations howsoever numerous at the calculating unit, said conservator unit comprising selective relays to close circuits corresponding to the quantity in storage and an auxiliary relay differentially conditioned according to the quality of the quantity in storage, a circuit differentially polarized by last said relay accordingly as the stored quantity be positive or negative to condition the directional relay, and means including the circuits closed by the storage relays to operate the accumulator under the control of the conservator unit.

2. In combination with a calculating unit comprising means for computing quantities whether positive or negative in quality, including an accumulator, a motor, reversible transmission from the motor for advancing the accumulator in respectively opposite directions to accumulate positive or negative quantities, a directional relay to condition the reversible transmission, circuits selectively closed by the accumulator corresponding to a previously accumulated quantity, a circuit controller operatively connected with the accumulator, and a circuit differentially conditioned by the circuit controller accordingly as the accumulated quantity be positive or negative; a conservator unit external to the calculating unit for the storage prolonged according to volition of quantities whether positive or negative for future computations howsoever numerous at the calculating unit, the said conservator unit comprising selective storage relays controlled by the circuits closed by the accumulator to close circuits corresponding to the stored quantity, and an auxiliary relay conditioned by the circuit controlled by the circuit controller to identify the quality of the quantity so stored, a circuit closed by the auxiliary relay to condition the directional relay according to the quality of the quantity in storage, and means including the circuits closed by the storage relays to operate the accumulator under the control of the conservator unit.

3. In combination with a calculating unit comprising means for computing quantities whether positive or negative in quality, including an accumulator, a motor, reversible transmission from the motor for advancing the accumulator in respectively opposite positive or negative directions, to accumulate a positive or negative quantity, a directional relay to control the reversible transmission; a plurality of conservator units external to the calculating unit for the storage prolonged according to volition of quantities whether positive or negative for future computations howsoever numerous at the calculating unit, each said conservator unit comprising selective storage relays for closing circuits corresponding to the quantity in storage, and an auxiliary relay differentially conditioned according to the quality of the quantity in storage; an ancillary relay, a circuit to condition said ancillary relay, a wire of last said circuit differentially polarized according to the quality of the quantity stored in one conservator unit, and a wire of said circuit differentially polarized by the auxiliary relay of a second conservator unit according to the quality of the quantity stored in last said conservator unit, to energize or to immobilize the ancillary relay accordingly as the polarization of the wires be dissimilar or similar in quality, a circuit differentially controlled by the ancillary relay for conditioning the directional relay to cause the reversible transmission to advance the accumulator in positive or negative direction accordingly as the ancillary relay be immobilized or energized, and means including the circuits closed by the storage relays of the two said conservator units to operate the calculating unit under the conjoint control of the two said conservator units.

4. In combination with a calculating unit comprising means for computing quantities whether positive or negative in quality, including an accumulator, a motor, reversible transmission from the motor for advancing the accumulator in respectively opposite positive and negative direction, to accumulate a positive or negative resultant, a directional relay to condition the reversible transmission; a plurality of conservator units external to the calculating unit for the storage prolonged according to volition of quantities whether positive or negative for future computations howsoever numerous at the calculating unit, each said conservator unit comprising selective storage relays for closing circuits corresponding to a stored quantity, and an auxiliary relay differentially conditioned according to the quality of the quantity so stored; an ancillary relay, a circuit to control the ancillary relay, a wire of last said circuit differentially polarized by a said auxiliary relay according to the quality of the quantity stored at one conservator unit and a wire of last said circuit differentially polarized by the auxiliary relay of a second conservator unit according to the quality of the quantity stored in last said conservator unit, for energizing or immobilizing the ancillary relay accordingly as the polarization of said wires be dissimilar or similar in quality, to identify the resultant as positive or negative in quality accordingly as last said relay be immobilized or energized.

5. In combination with a calculating unit comprising means for computing quantities, including an accumulator of selective denominational orders, a motor, transmission from the motor, an electric clutch to connect the transmission with the accumulator, a circuit to energize the clutch; a conservator unit external to the calculating unit for the storage prolonged according to volition of a quantity for future computations howsoever numerous at the calculating unit, the said conservator unit comprising selective storage relays corresponding to numerals and orders, to close circuits corresponding to the quantity in storage; means for quantitatively comparing the stored quantity with a quantity accumulated by the accumulator, the last said means comprising a comparator relay, to close or break the circuit to said clutch accordingly as last said relay be energized or in open circuit, comparator circuits corresponding to the numerals and orders of the accumulated quantity selectively closed by the accumulator to terminals at the storage relays of corresponding numeral and order, bridges at the storage relays to complete the comparator circuit corresponding to the initial numeral of the accumulated quantity and energize the comparator relay, if the terminal of last said circuit be cooperative with a storage relay corresponding to a higher numeral than the relay corresponding to the initial numeral of the quantity in storage, bridges at the storage relays to close the last said comparator circuit to a comparator circuit of next lower order for similar comparison at a lower or at lower orders of the storage relays, if the terminal of the comparator circuit corresponding to the initial numeral of the accumulated quantity be cooperative with the storage relay corresponding to the initial numeral of the stored quantity, and bridges to throw the comparator into open circuit, if the terminal of last said comparator relay be cooperative with a storage relay corresponding to a lower numeral than the storage relay corresponding to the initial numeral of the quantity in storage.

6. In combination with a calculating unit comprising means for computing quantities whether positive or negative in quality, said means including an accumulator consisting of selective denominational members, a motor, reversible transmission from the motor including selective clutches for operating the accumulator in respectively opposite directions to accumulate a positive or negative quantity, circuits to said clutches, a directional relay selectively to condition a said circuit, a circuit controller operatively connected with the accumulator, a circuit differentially conditioned by the circuit controller according to the quality of the accumulated quantity; a conservator unit external to the calculating unit for the storage prolonged according to volition of a quantity for future computations howsoever numerous at the calculating unit, said conservator unit comprising selective storage relays corresponding to numerals and orders, to close circuits corresponding to the quantity in storage and an auxiliary relay differentially conditioned according to the quality of the stored quantity differentially to condition the directional relay; means for quantitatively comparing the stored quantity with an accumulated quantity, the last said means including, a comparator relay to complete or break the circuit conditioned by the directional relay, accordingly as the comparator relay be energized or in open circuit, denominational comparator circuits corresponding to the numerals and orders of the accumulated quantity, closed by the accumulator to terminals controlled by the respective storage relays corresponding to like numerals and orders, bridges at the storage relays to complete the comparator circuit corresponding to the initial numeral of the accumulated quantity to energize the comparator relay, if the terminal of last said circuit be cooperative with a storage relay corresponding to a higher numeral than the relay corresponding to the initial numeral of the quantity in storage, bridges at the storage relays to close last said comparator circuit to a comparator circuit of next lower order for similar comparison at said lower order or at lower orders of the storage relays, if the terminal corresponding to the initial numeral of the stored quantity be cooperative with the storage relay corresponding to the initial numeral of the stored quantity, bridges to break circuit to the comparator relay, if the terminal corresponding to the initial numeral of the accumulated quantity be cooperative with a storage relay corresponding to a lower numeral than the storage relay corresponding to the initial numeral of the quantity in storage; and a relay controlled by the circuit conditioned by the circuit controller to switch the comparator circuits in relatively reversed numerical order to the said terminals, accordingly as the accumulated quantity be positive or negative in quality.

HENRY JEWETT FURBER.